(12) United States Patent
    Seth

(10) Patent No.: US 9,846,482 B2
(45) Date of Patent: **\*Dec. 19, 2017**

(54) WEARABLE WIRELESS HMI DEVICE

(71) Applicant: Protocode Inc., Brampton (CA)

(72) Inventor: Rohit Seth, Brampton (CA)

(73) Assignee: PROTOCODE INC., Brampton (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/237,587

(22) Filed: Aug. 15, 2016

(65) Prior Publication Data
    US 2017/0038839 A1   Feb. 9, 2017

Related U.S. Application Data

(63) Continuation of application No. 14/963,214, filed on Dec. 8, 2015, now Pat. No. 9,417,693.

(60) Provisional application No. 62/089,216, filed on Dec. 8, 2014.

(51) Int. Cl.
    *G06F 3/01* (2006.01)
(52) U.S. Cl.
    CPC .............. *G06F 3/014* (2013.01); *G06F 3/017* (2013.01)
(58) Field of Classification Search
    CPC .. G09F 1/1693; G06F 3/0425; G06F 3/04883; G06F 3/017; G06F 3/014
    See application file for complete search history.

(56) References Cited

U.S. PATENT DOCUMENTS

| 9,222,989 B2 | 12/2015 | Hesen et al. |
| 9,417,693 B2 * | 8/2016 | Seth .................. G06F 3/014 |
| 2002/0152077 A1 | 10/2002 | Patterson |
| 2014/0240103 A1 | 8/2014 | Lake et al. |
| 2014/0267024 A1 | 9/2014 | Keller et al. |

OTHER PUBLICATIONS

Borghetti et al., "Sensorized Glove for Measuring Hand Finger Flexion for Rehabilitation Purposes," IEEE Transcation on Instrumentation and Measurement, vol. 62, No. 12, Dec. 2013, 7 pgs.
Dipietro et al., "A Survey of Glove-Based Systems and Their Applications," IEEE Transactions and Systems, Man, and Cybernetics—Part C: Applications and Reviews, vol. 38, No. 4, Jul. 2008, 22 pgs.
Havalagi et al., "'The Amazing Digital Gloves that Give Voice to the Voiceless," International Journal of Advances in Engineering & Technology, Mar. 2013, vol. 6, Issue 1, 10 pgs.

(Continued)

*Primary Examiner* — Abbas Abdulselam
(74) *Attorney, Agent, or Firm* — Morgan, Lewis & Bockius LLP

(57) ABSTRACT

A wearable gesture control interface apparatus is used to control a controllable device based on gestures provided by a user. The wearable gesture control interface apparatus includes (i) sensors configured to detect user orientation and movement and generate corresponding sensor data and (ii) a microcontroller configured to: sample the sensor data from the sensors, determine whether the sensor data from one of the sensors meets transmission criteria; and if the sensor data meets the transmission criteria, transmitting control data corresponding to all of the sensors to the controllable device.

30 Claims, 23 Drawing Sheets

(56) References Cited

OTHER PUBLICATIONS

Li et al., "Design and Validation of a Multi-Finger Sensing Device Based on Optical Linear Encoder," IEEE International Conference on Robotics and Automation. May 2010, 6 pgs.
Prabhuraj et al., "Gesture Controlled Home Automation for Differently Challenged People," International Journal of Research in Electronics, vol. 1, Issue 2, 2014, 6 pgs.
Saggio to et al., "Wireless Sensory Glove System Developed for Advanced Human Computrer Interface," International Journal of Information Science, 2012, vol. 2, No. 5, 6 pgs.
Seth, Rohit, International Search Report and Written Opinion, PCT/CA2015/051294, dated Feb. 26, 2016, 9 pgs.
Seth, Notice of Allowance, U.S. Appl. No. 14/963,214, dated Apr. 12, 2016, 13 pgs.
Shamsil et al., "Motion Tracking Glove for Human-Machine Interaction: Grasp & Release," McMaster University, 2010, 45 pgs.
Simone et al., "A Low Cost Instrumented Glove for Extended Monitoring and Functional Hand Assessment," Journal of Neuroscience Methods, vol. 160, 2007, 14 pgs.

\* cited by examiner

WEARABLE WIRELESS HMI DEVICE

CROSS-REFERENCE TO RELATED APPLICATIONS

This application is a continuation of U.S. patent application Ser. No. 14/963,214 filed Dec. 8, 2015 entitled "WEARABLE WIRELESS HMI DEVICE, and claims the benefit of U.S. Provisional Patent Application No. 62/089,216 filed Dec. 8, 2014 entitled "WEARABLE WIRELESS HMI DEVICE," both of which are incorporated by reference herein in their entirety.

TECHNICAL FIELD

The disclosed implementations relate to wearable-technology gesture control. More particularly, the disclosed implementations relate to wearable Human Machine Interface (HMI) devices, namely gloves and other garments fitted with sensors, switches, control units, wireless communication modules and power sources, enabling wearers to wirelessly control and send input parameters to electronic receivers and computing devices.

BACKGROUND

Wearable technology has gained increase acceptance in recent years, but most such devices are still at the experimental stage, and the ones available commercially still have numerous drawbacks. Within the wearable technology field, Gesture Control Gloves were among the earliest products to appear in the market, yet they are currently still suffering from restricted functionality and a marked lack of versatility. For example, the Nintendo Power Glove was an early example of a wearable hand device used solely for the purpose of gaming.

Further compounding the lack of versatility is the fact that most current wearable glove technology lacks wireless capability; the user can only move as far away from the receiving device as the length of cables/wires will allow. The use of embedded mechanical springs also contributes to the rigidity of such devices and reduces the consumer appeal, while the reliance on custom communications protocols for many such devices further hinders their wide adoption.

There is an unmet need in the market for a wearable gesture glove which implements communication protocol standards known in the industry for interfacing with electronics and computers (i.e. Keyboard, Mouse, Joysticks—well integrated functionally), and which also has the ability to replace mice, gamepads and joysticks to control electronic devices (such as drones, gaming consoles, computers, TV sets, home automation appliances) and to convert hand-sign language into more understandable means of communication (such as text or spoken words).

SUMMARY

Various implementations of devices, apparatuses, and methods within the scope of the appended claims each have several aspects, no single one of which is solely responsible for the attributes described herein. Without limiting the scope of the appended claims, after considering this disclosure, and particularly after considering the section entitled "Detailed Description," one will understand how the aspects of various implementations are used for creating context-based event entries.

In accordance with some implementations, a wearable gesture control interface apparatus is used for controlling a controllable device based on gestures provided by a user. In some implementations, the wearable gesture control interface apparatus may include: a plurality of sensors configured to detect orientation and/or position and/or movement and/or flexion of the user and generate sensor data corresponding to the orientation and/or position and/or movement and/or flexion; and a microcontroller configured to: sample, using a sampling module, the sensor data from the plurality of sensors; determine, using a determining module, whether the sensor data from one of the plurality of sensors meets transmission criteria; and in accordance with a determination that the sensor data from the one of the plurality of sensors meets the transmission criteria, transmit, using a transmitting module, control data corresponding to all of the plurality of sensors to the controllable device.

In some implementations, a wearable gesture control interface apparatus is used for controlling a controllable device based on gestures provided by a user. The wearable gesture control interface apparatus including: a plurality of sensors configured to detect orientation and/or position and/or movement and/or flexion of the user and generate sensor data corresponding to the orientation and/or position and/or movement and/or flexion; and a microcontroller operable in a low latency mode and a high accuracy mode, the microcontroller configured to: sample, using a sampling module, the sensor data from the plurality of sensors; generate, using a generating module, a sensor output based on the sensor data from a portion of the plurality of sensors when operating in the low latency mode; and generate, using the generating module, a sensor output based on the sensor data from all of the plurality of sensors when operating in the high accuracy mode.

In some implementations, a sensor is used for measuring flexing or bending of an object. The sensor including a first flexible electrically conductive plate and a second flexible electrically conductive plate; a flexible semi-conductive porous substrate disposed between and contacting the first and second electrically conductive plate, where a resistance of the semi-conductive porous substrate varies based on an amount of flexion of the semi-conductive porous substrate; a first lead connected to the first flexible electrically conductive plate, the first lead configured to receive a drive signal, the drive signal being altered based on the resistance of the semi-conductive porous substrate to generate an output signal; and a second lead connected to the second flexible electrically conductive plate, the second lead configured to transmit the output signal directly to the microcontroller without requiring additional signal conditioning.

In some implementations, a wearable gesture control interface apparatus is used for controlling a controllable device based on gestures provided by a user. The wearable gesture control interface apparatus including a plurality of sensors configured to detect orientation and/or position and/or movement and/or flexion of the user and generate sensor data corresponding to the orientation and/or position and/or movement and/or flexion; and a microcontroller operable in a low latency mode and a high accuracy mode, the microcontroller being configured to: sample, using a sampling module, the sensor data from the plurality of sensors; determine, using a determining module, whether the sensor data from one of the plurality of sensors meets transmission criteria; and in accordance with a determination that the sensor data from the one of the plurality of sensors meets the transmission criteria, the microcontroller configured to: generate, using a generating module, control data based on the sensor data from a portion of the plurality of sensors when operating in the low latency mode; and generate, using the generating module, control data based on the sensor data from all of the plurality of sensors when operating in the high accuracy mode; and transmit, using a transmitting module, the control data to the controllable device.

Various advantages of the present application are apparent in light of the descriptions below.

BRIEF DESCRIPTION OF THE DRAWINGS

For a better understanding of the aforementioned aspects of the invention as well as additional aspects and implementations thereof, reference should be made to the Detailed Description below, in conjunction with the following drawings in which like reference numerals refer to corresponding parts throughout the figures.

FIG. 21 is a block diagram showing functional details of the wearable HMI device of FIG. 20a.

FIG. 22 is a block diagram showing functional details of an electronic device controllable by the wearable HMI device of FIG. 20a.

Like reference numerals refer to corresponding parts throughout the several views of the drawings.

DETAILED DESCRIPTION

Numerous details are described herein in order to provide a thorough understanding of the example implementations illustrated in the accompanying drawings. However, some implementations may be practiced without many of the specific details, and the scope of the claims is only limited by those features and aspects specifically recited in the claims. Furthermore, well-known methods and systems have not been described in exhaustive detail so as not to unnecessarily obscure more pertinent aspects of the implementations described herein.

Figure 1:
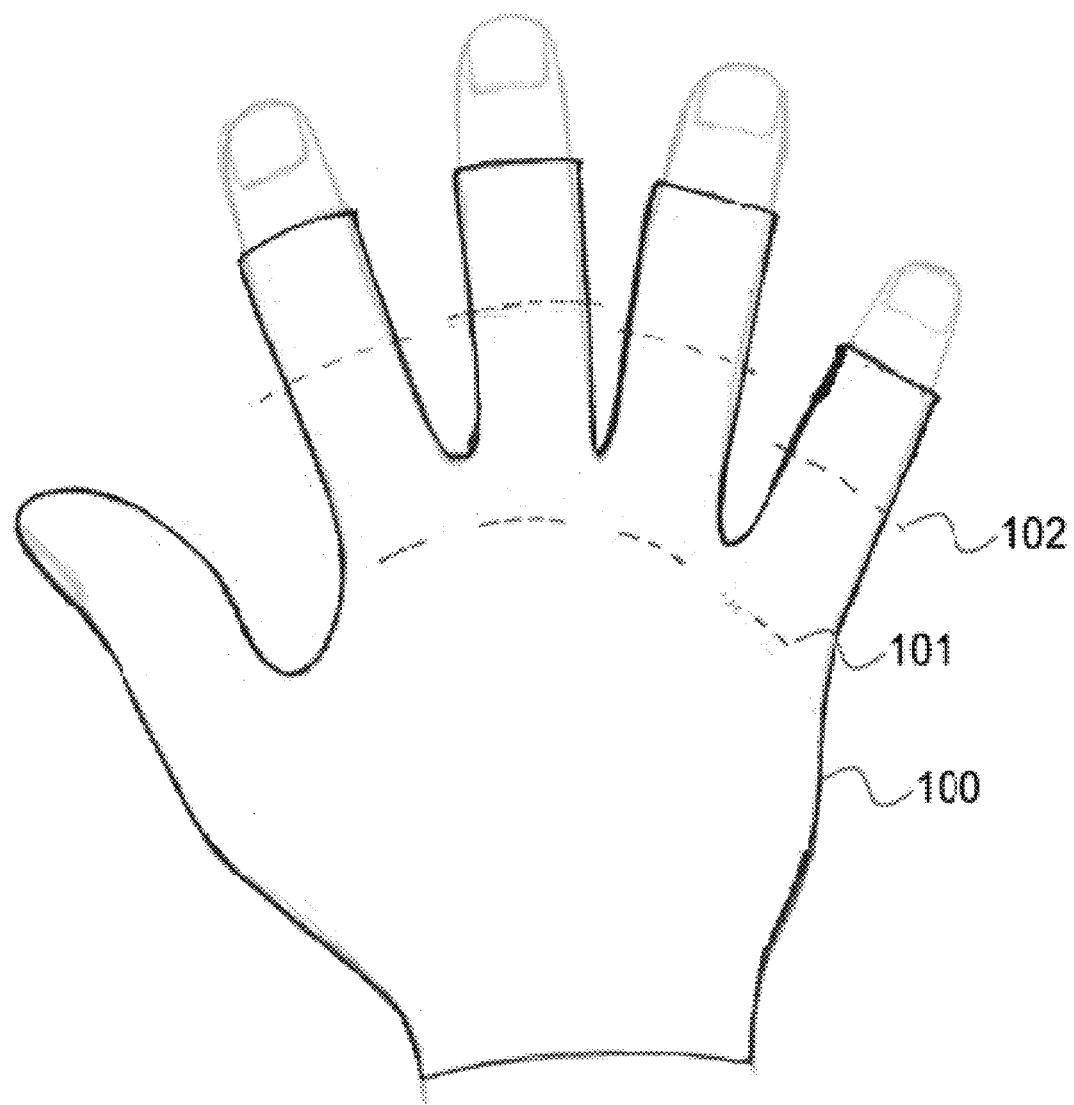
FIG. 1 is a dorsal view of the inner lining of the Gesture Glove.

Referring now to the invention in more detail, FIG. 1 illustrates the dorsal view of the inner lining 100 of an example implementation of a Gesture Glove. In some implementations, a comfortable blend of polyester or cotton fabric is used for the inner lining 100. The Metacarpophalangeal joint 101 and the Proximal Interphalangeal joint 102 are also delineated in FIG. 1, for positional reference of sensors and electronic components.

Figure 2:
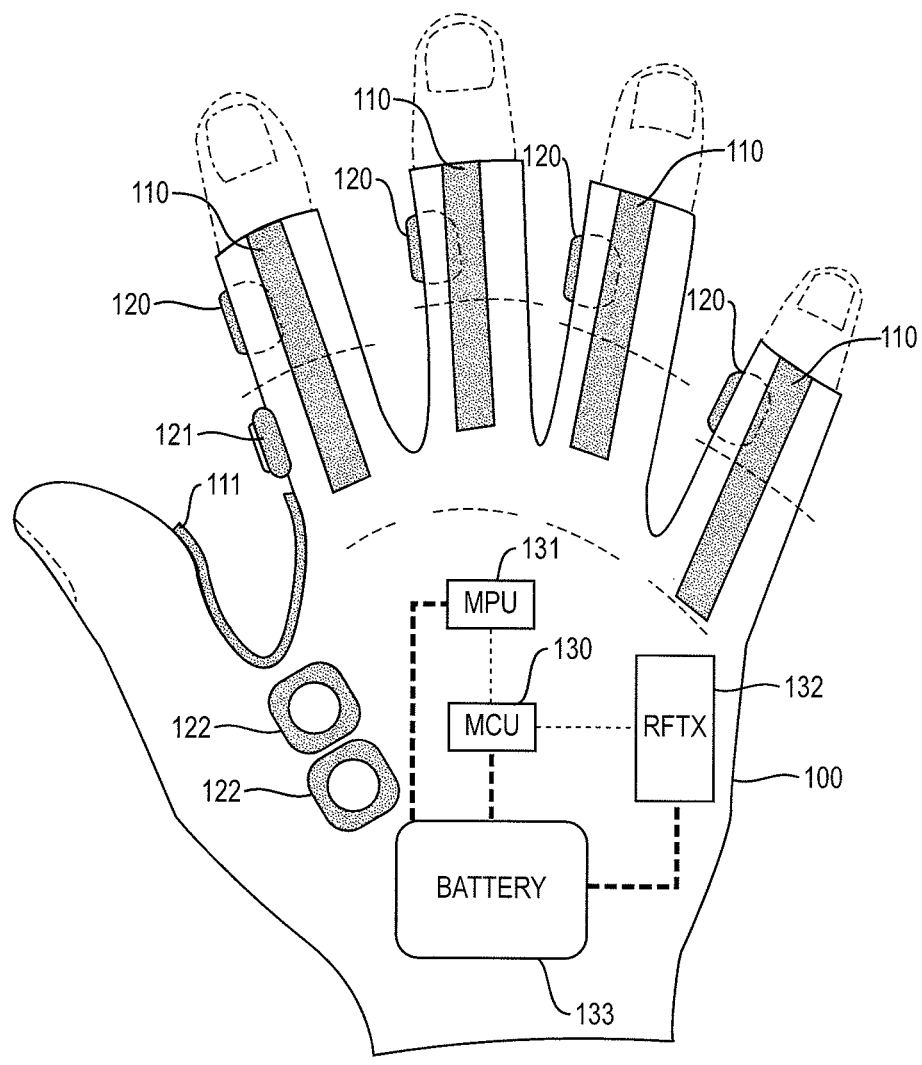
FIG. 2 shows the relative positioning of all sensors, switches, battery and electronic components of the Gesture Glove.

FIG. 2 is a dorsal see-through view of an example implementation of the Gesture Glove, showing the relative positioning of joint sensors 110, 111, pushbutton switches 120, 121, 122, Microcontroller (MCU) 130, Motion Processing Unit (MPU) 131, Radio Frequency Transmission Unit (RFTX) 132, and the power source (e.g., a battery pack or one or more lithium polymer batteries, such as of the rechargeable type) 133. For greater clarity, the words "switch" or "switches" throughout this disclosure shall mean, without limitation any of: positional switches, directional switches, directional controls, miniature joysticks, etc. In some implementations, in addition to the sensors and switches described herein, the Gesture Glove may include one or more joy sticks, infrared sensors, global positioning system sensors, or any similar sensors configured to detect user gestures or user inputs. In some implementations, positions and numbers of the sensors, switches, electronic components (e.g., the MCU, MPU, RFTX and power source) and alternative input devices (e.g., joy sticks, etc.) are different in whole or in part from the positions and numbers of those components as illustrated in FIG. 2. Such differences can be due to packaging constraints of different implementations (e.g., room available for the power supply), or operational and/or ergonomic constraints applicable to the sensors and/or user input devices (e.g., user-friendly positioning of a joystick).

Four bend sensors 110 are placed on the dorsal side of the Proximal Interphalangeal joint 102, and one bend sensor 111 is placed between the thumb and the index finger. Additional bend sensors (similar to bend sensor 111) may be optionally placed between each of the other fingers. Four switches are mounted obliquely, on the Medial Phalanx of each finger 120. The index finger contains an additional switch on the Proximal Phalanx 121. Two more switches are mounted on the dorsal surface of the hand 122, at the base of the thumb, for auxiliary control functions.

Figure 3:
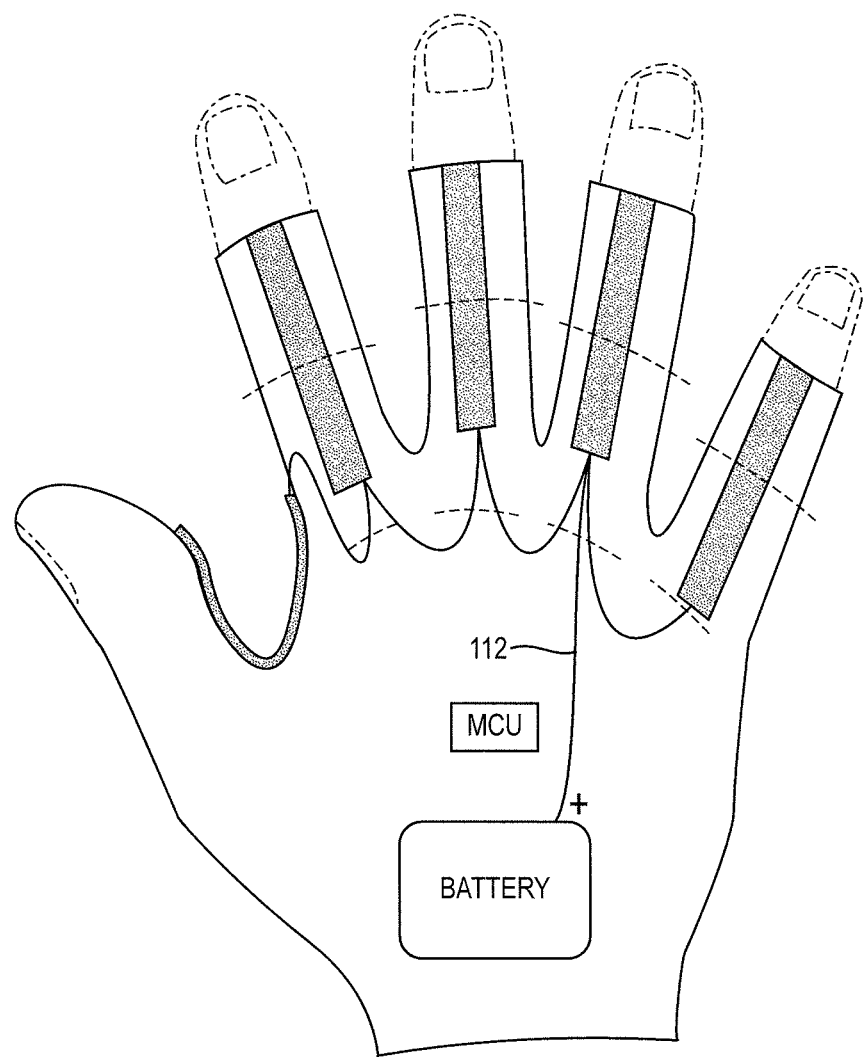
FIG. 3 illustrates the Positive (+) voltage wiring layer of the Gesture Glove for Bend Sensors.

FIG. 3 illustrates the Positive (+) voltage wiring layer 112 used to drive the bend sensors 110 and 111. Each bend sensor receives the source voltage with a parallel wiring schema.

Figure 4:
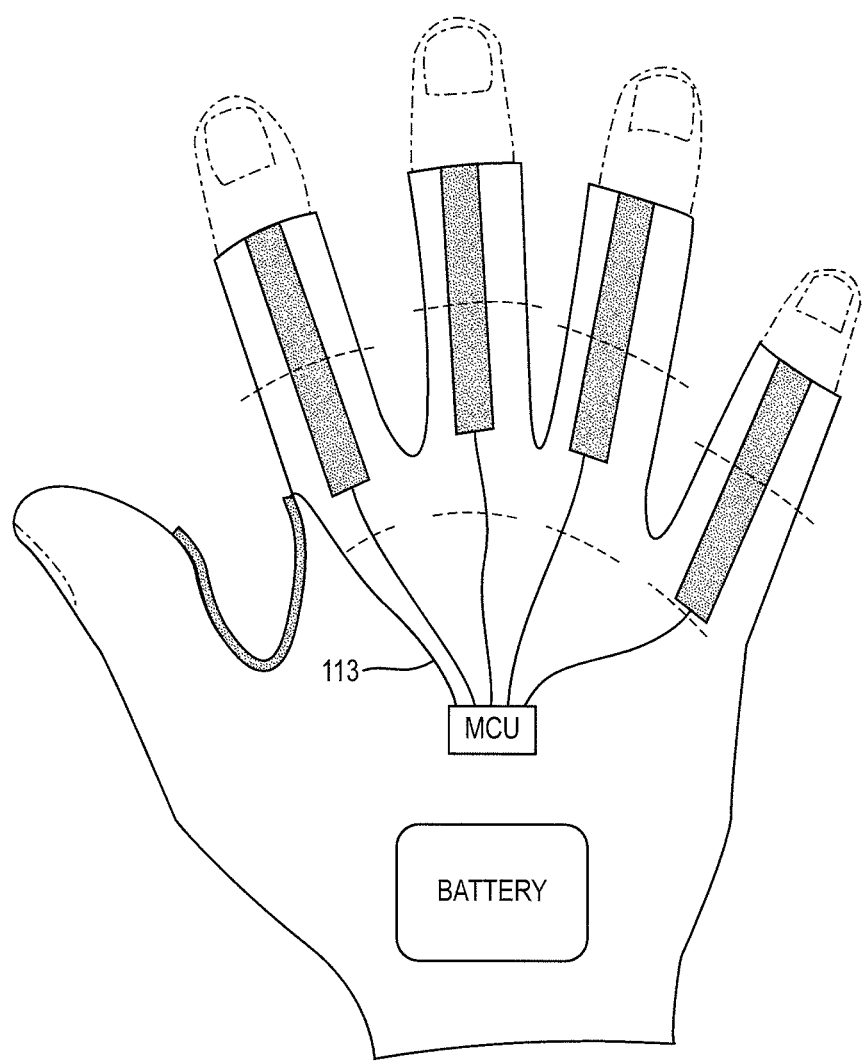
FIG. 4 illustrates the connections between the bend sensors and the Microcontroller Unit (MCU).

FIG. 4 illustrates the connection of individual bend sensor 110, 111 signal wires 113 with the Microcontroller Unit (MCU) 130. Each bend sensor is monitored individually by the MCU software for state change.

Figure 5:
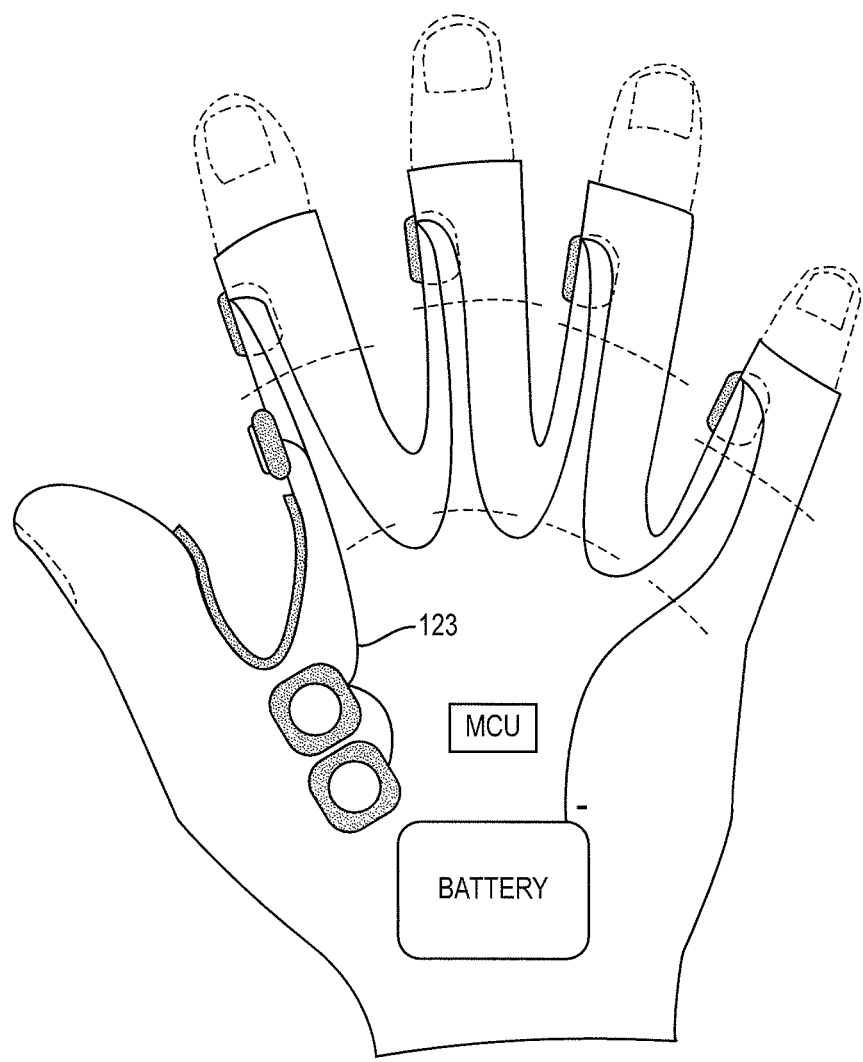
FIG. 5 illustrates the Negative (−) voltage wiring layer of the Gesture Glove for Switches.

FIG. 5 illustrates the Negative (−) voltage wiring layer 123 used to drive pushbutton switches 120, 121, 122. Each pushbutton switch is linked to the source voltage with a parallel wiring schema. Each pushbutton switch may provide a digital signal to the MCU indicating that a pushbutton is "pressed" or not "pressed".

Figure 6:
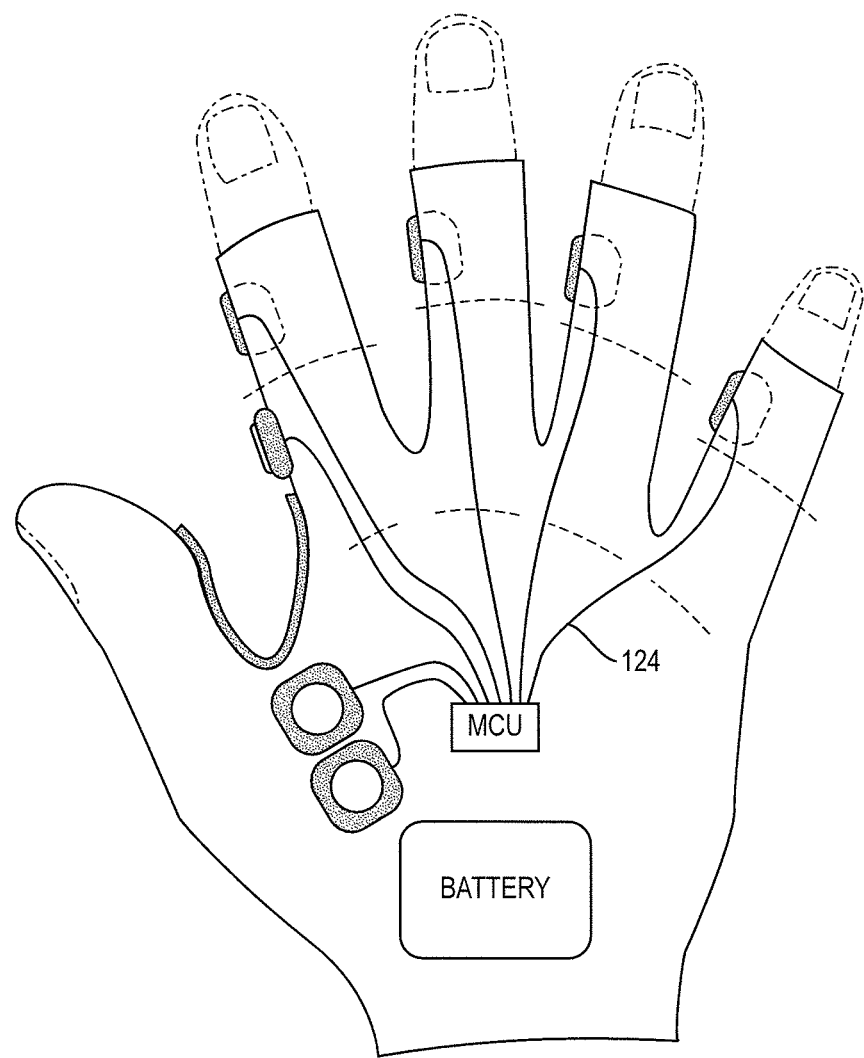
FIG. 6 illustrates the connections between the pushbutton switches and the MCU.

FIG. 6 illustrates the connection of individual pushbutton switches 120, 121, 122 signal wires 124 to the microcontroller unit (MCU). Each pushbutton switch position is monitored by the MCU software for state change.

Figure 7:
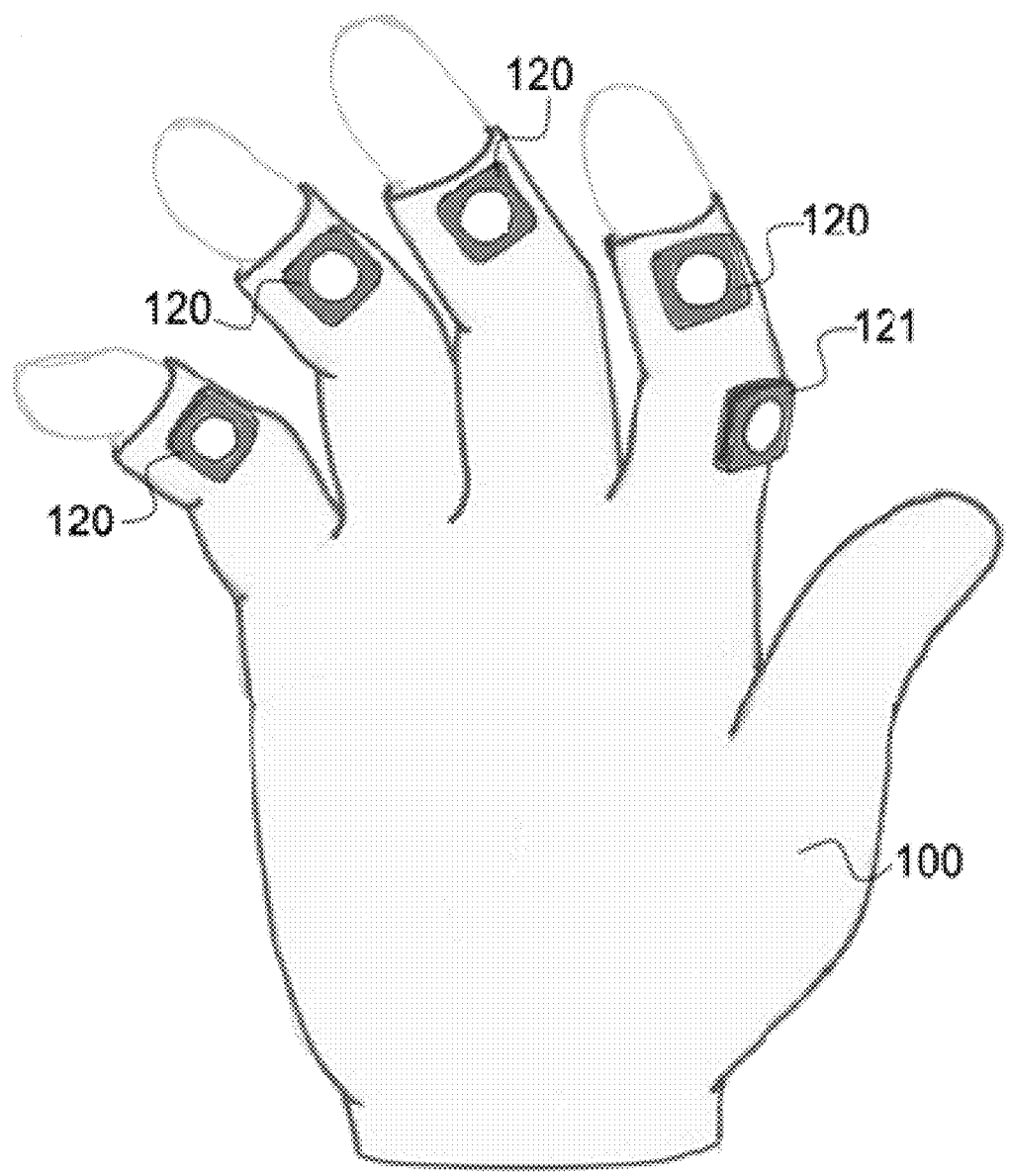
FIG. 7 illustrates the mounting positions of pushbutton switches on the fingers of the Gesture Glove.

FIG. 7 illustrates the oblique mounting of pushbutton switches on the Medial Phalanges 120, a typical arrangement for four fingers, and the additional pushbutton switch 121 on the Proximal Phalanx of the index finger parallel to the sagittal plane. This orientation prevents accidental actuation of switches while flexing fingers.

Figure 8:
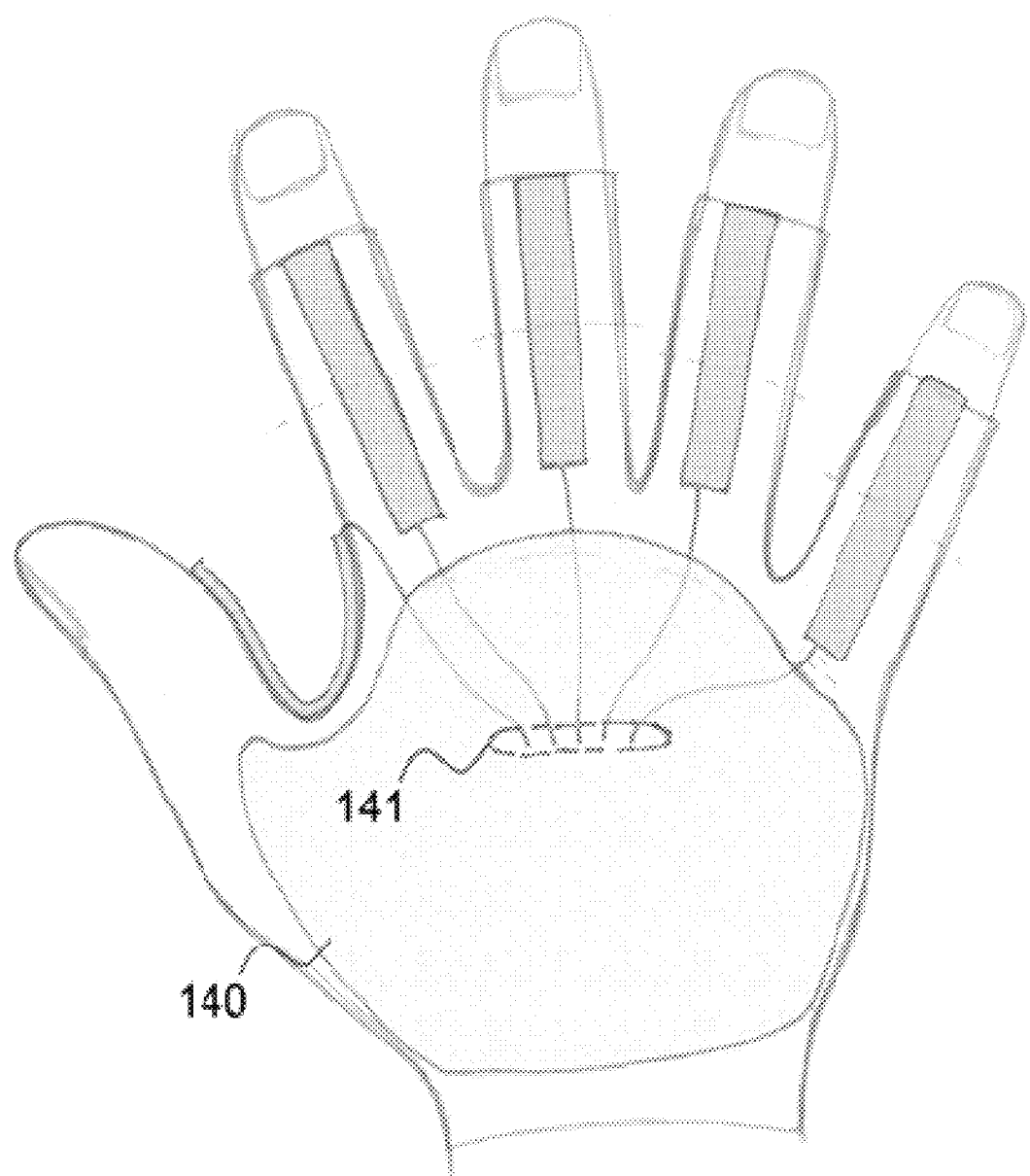
FIG. 8 illustrates the primary layer of felt-type material of the Gesture Glove.

FIG. 8 illustrates the primary layer of soft, thin, felt-type material 140 over the wiring stratum. Wires run under the fabric overlay. A slot or opening is provided in the middle of the fabric 141 for the wiring to penetrate the top side of the fabric for connectivity with their respective destination points.

Figure 9:
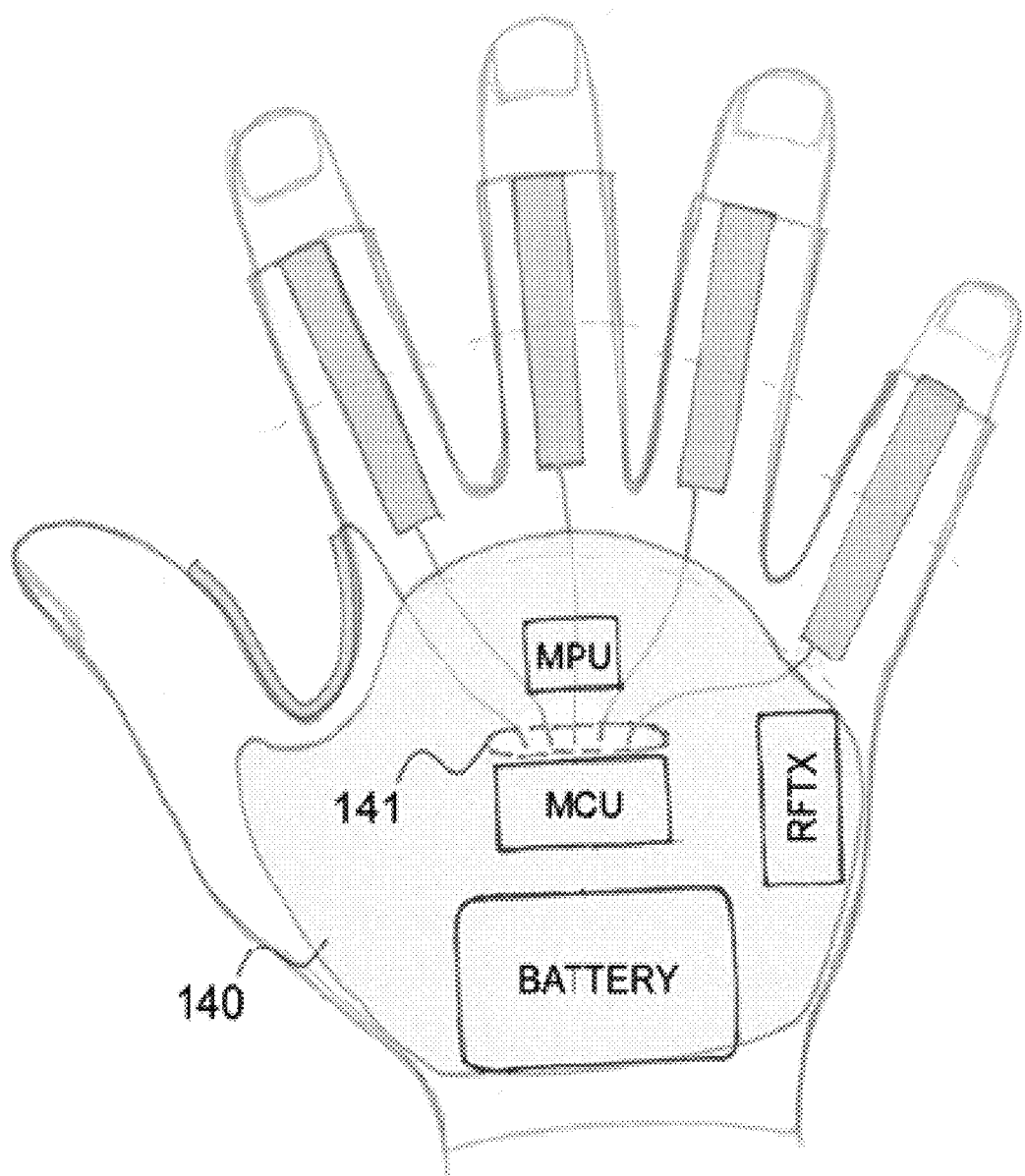
FIG. 9 illustrates the wiring from the MCU (on top of the layer depicted in FIG. 8 above) to the switches and sensors (found underneath the top of the layer depicted in FIG. 8).

FIG. 9 illustrates the connection of communication wiring 141 to the MCU mounted on top of the felt type fabric 140. The fabric layer protects and isolates wiring underneath and electronics modules above (MPU, MCU, BATTERY, RFTX).

Figure 10:
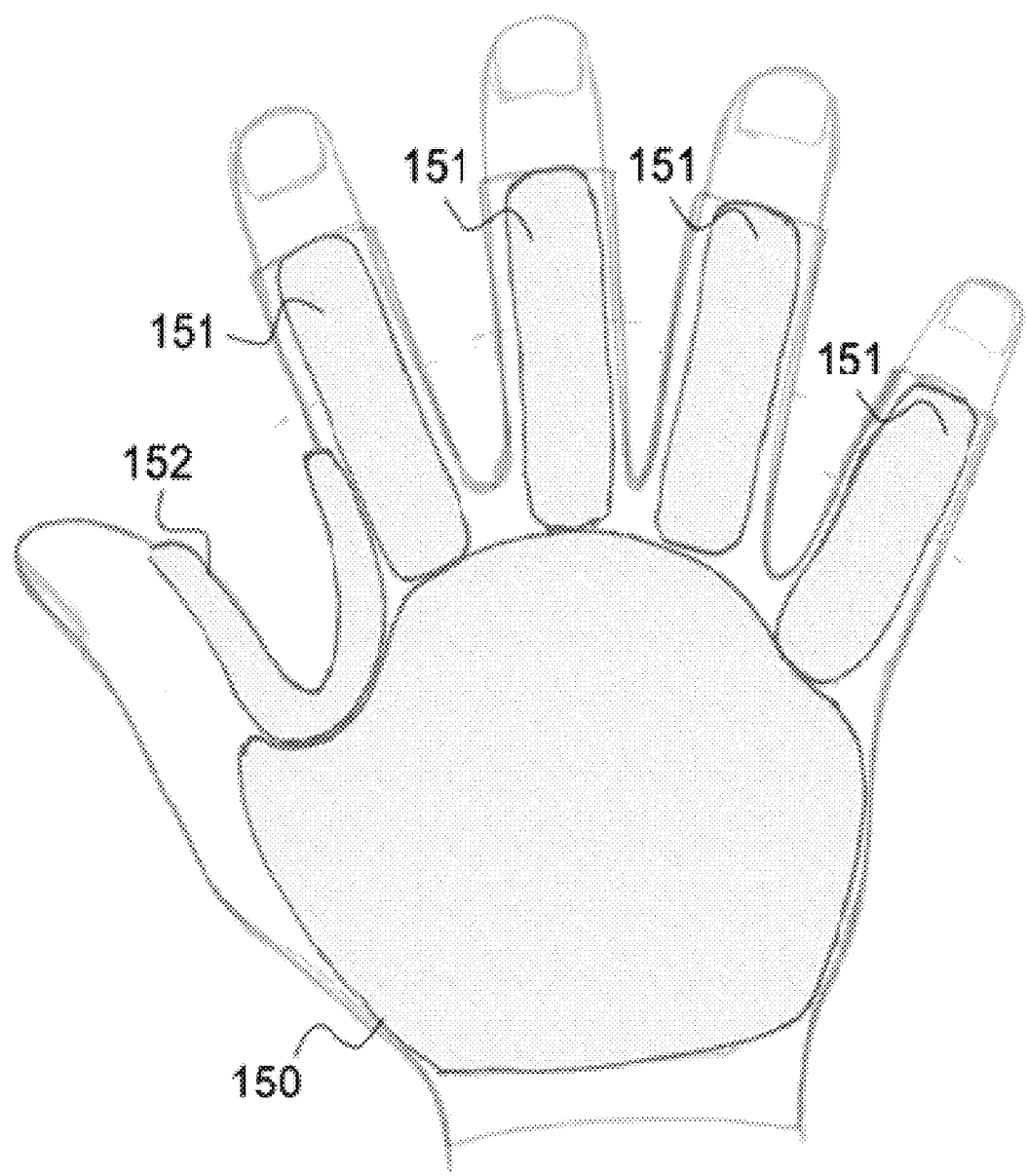
FIG. 10 illustrates the protection layer of thin felt-type material applied on top of the MCU and on top of the bend sensors.

FIG. 10 illustrates the final layer of thin felt type material 150, 151, 152 to protect the electronics modules (MPU, MCU, RFTX), and bend sensors 110, 111, respectively.

Figure 11:
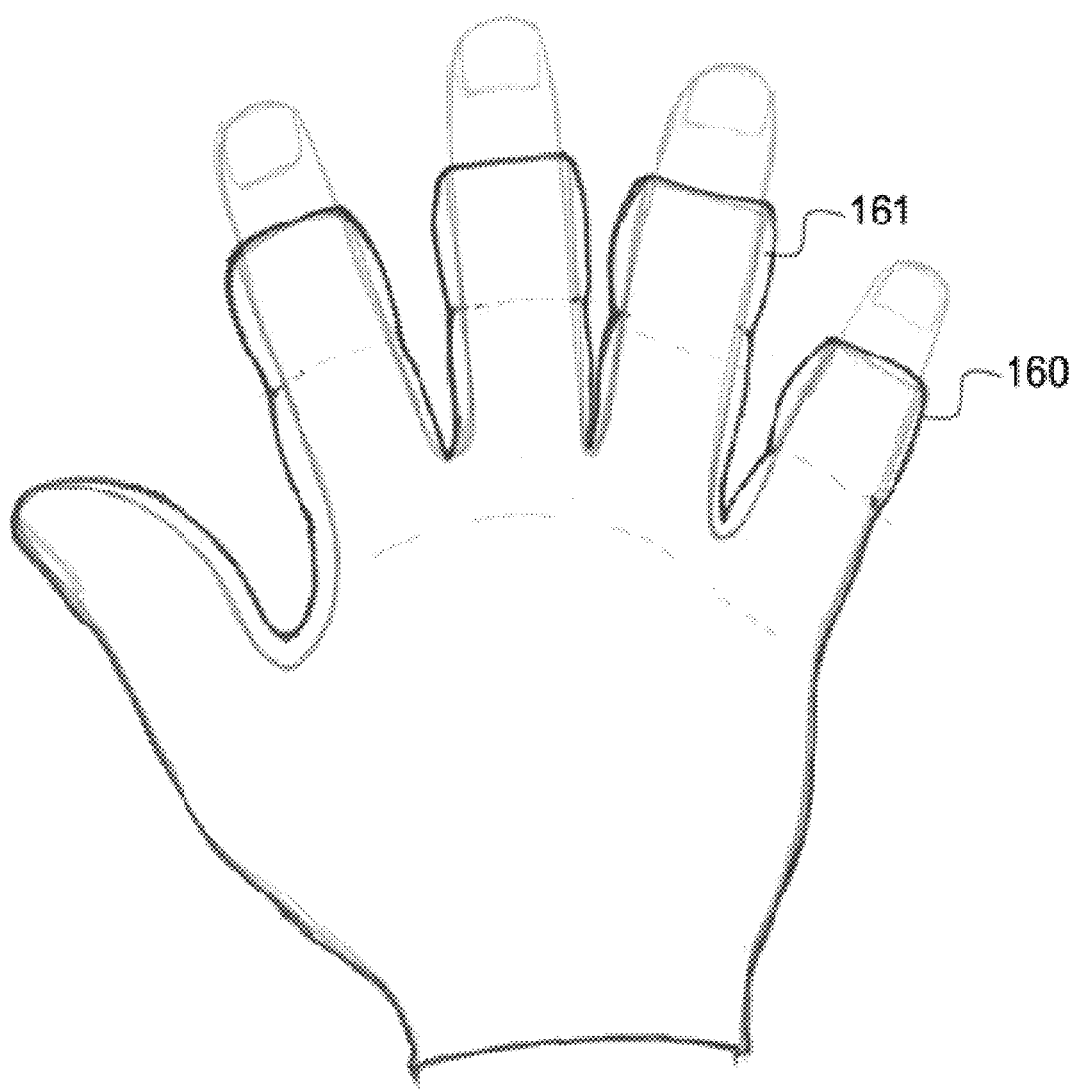
FIG. 11 illustrates the final outer jacket of the Gesture Glove (encasing all composite layers below).

FIG. 11 illustrates the mounting of the final outer jacket (160) over the composite layers below; the final external jacket is made of a compression fit fabric to finish the glove. Additional packing material 161, such as felt, may be used to fill in and balance protrusion points of the glove at the Phalanges caused by embedded pushbutton switches mounted obliquely on the Medial-Phalanges of fingers 120.

Figure 12:
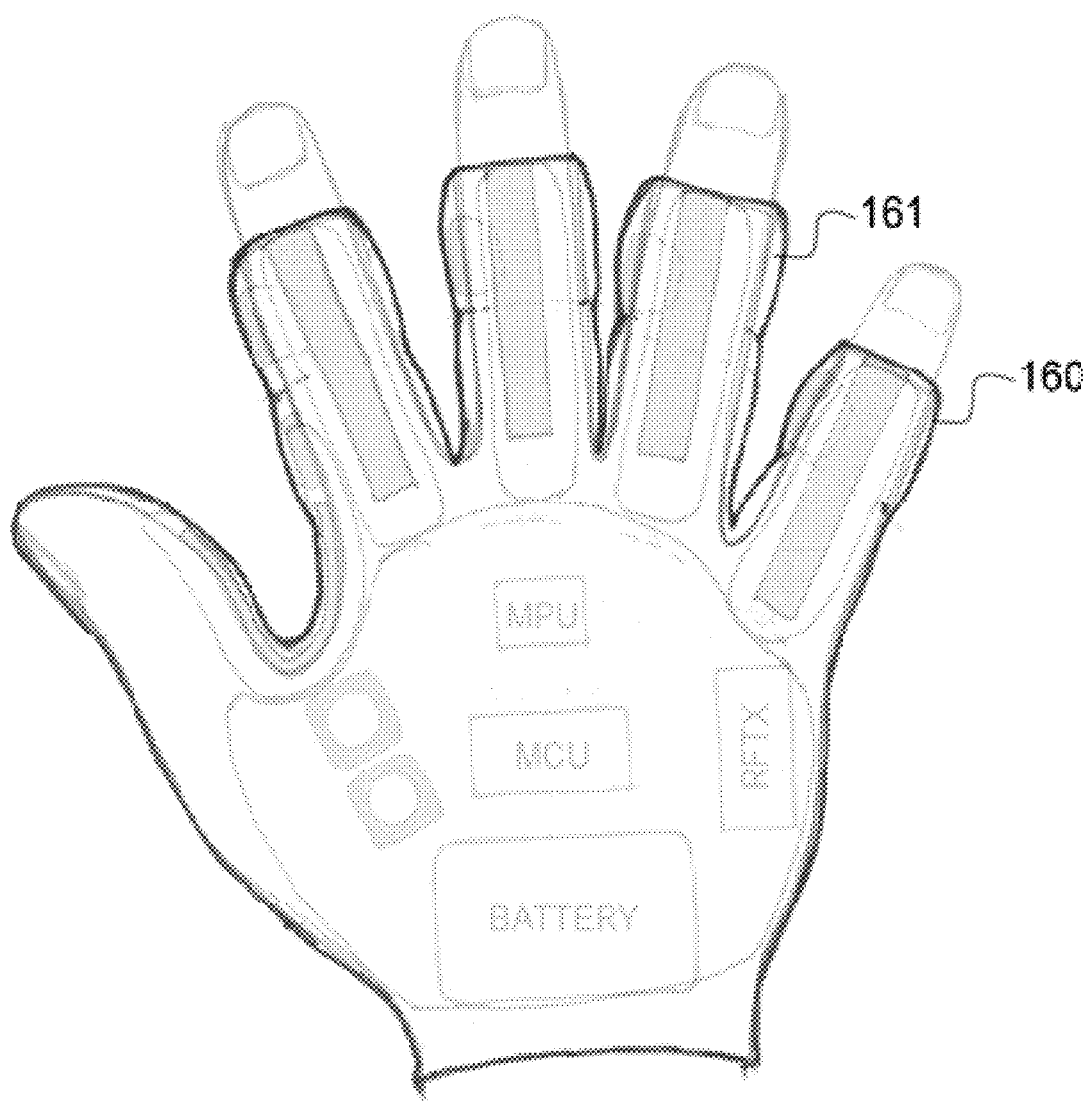
FIG. 12 is a partial see-through view of the overall assembled Gesture Glove, showing all its substrata of electronics and fabric linings partially visible under the outer jacket.

FIG. 12 illustrates the overall assembly of the gesture glove with its substrata of electronics and fabric linings partially visible under the outer jacket 160.

Figure 13:
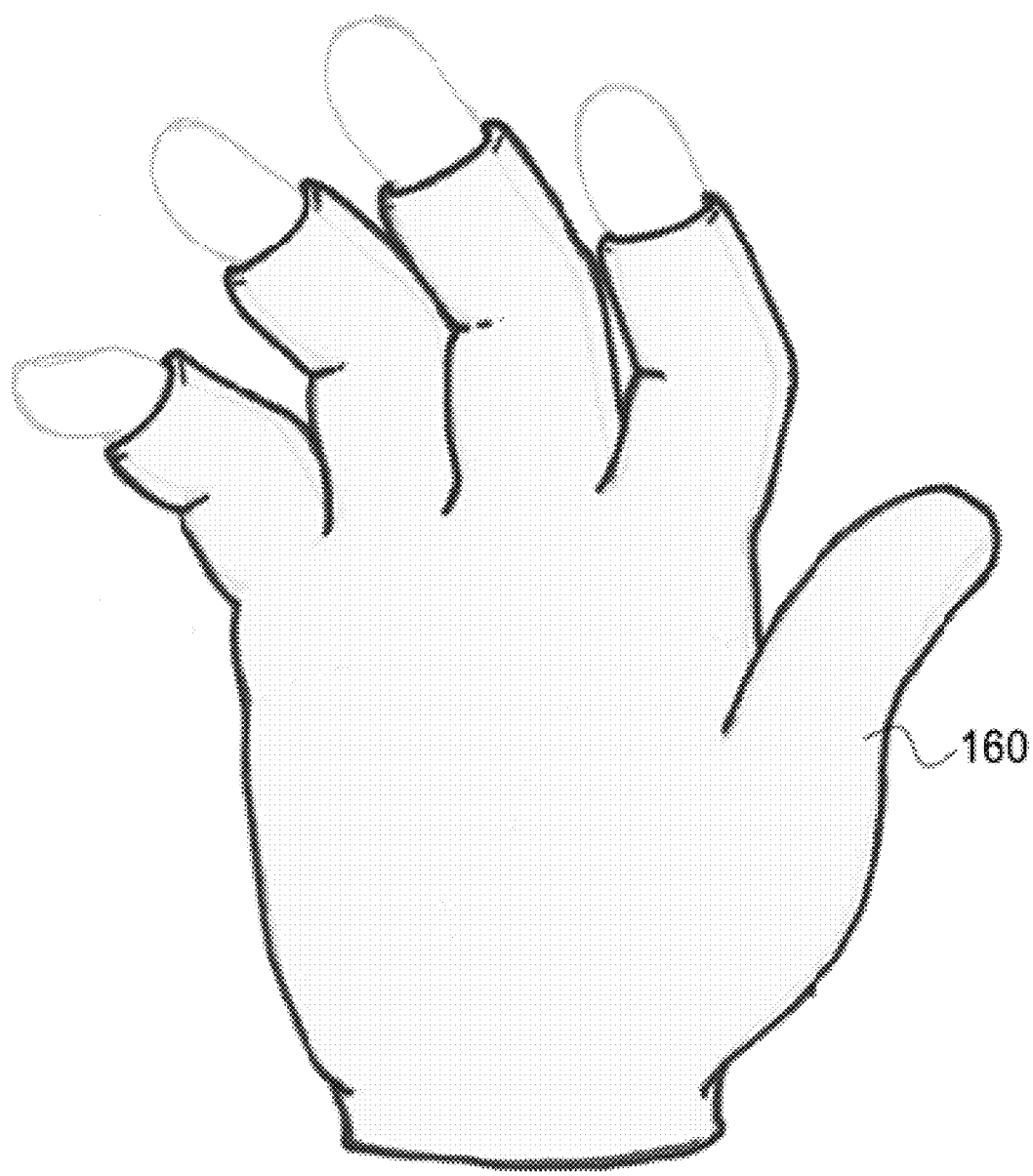
FIG. 13 is an isometric view of the finished Gesture Glove with its outer jacket.

FIG. 13 is an isometric view of the finished Gesture Glove with the outer jacket 160.

Figure 14:
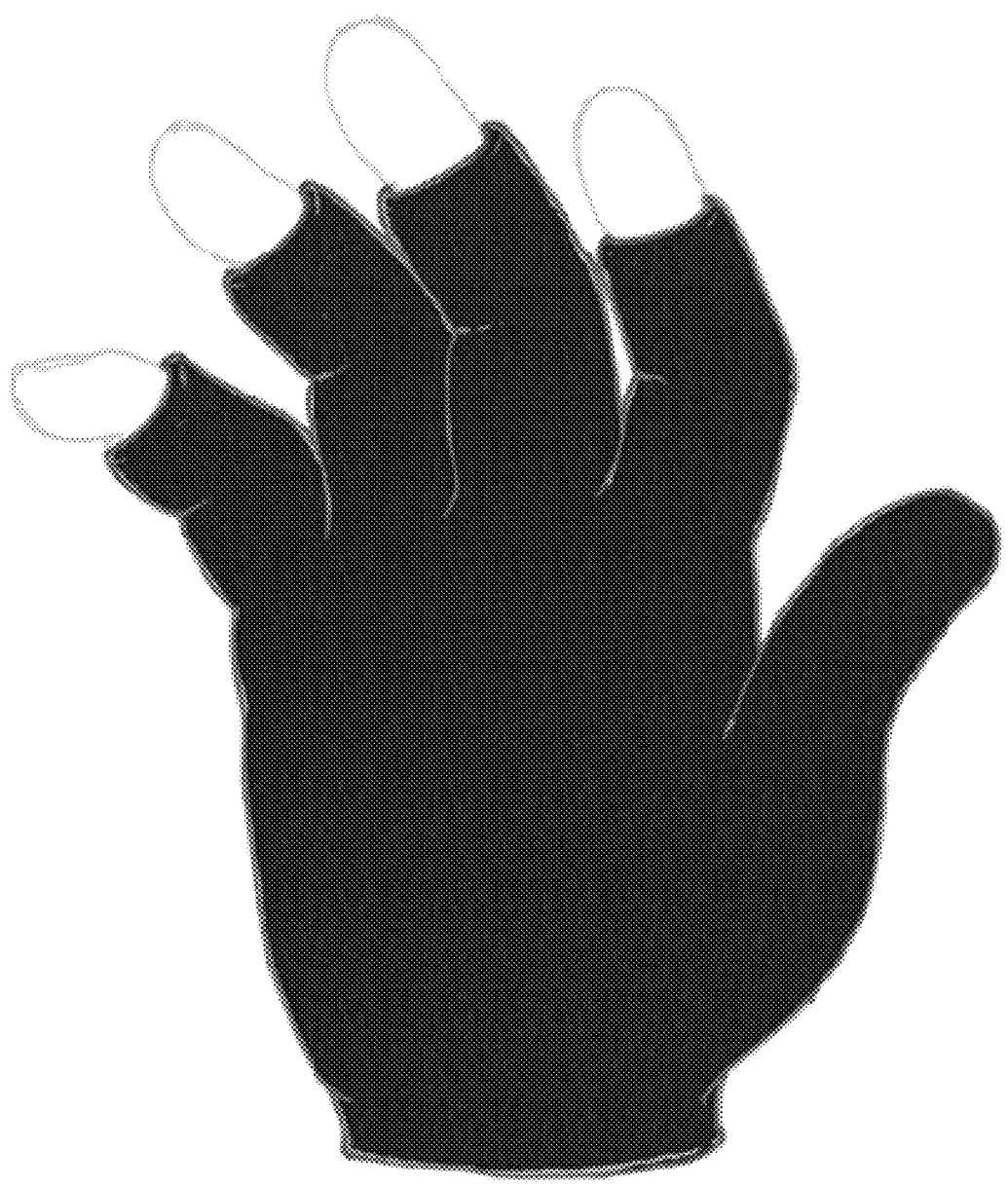
FIG. 14 is a surface rendered view of the finished Gesture Glove.

FIG. 14 is a surface rendered view of the finished Gesture Glove using a compression fit material.

Figure 15:
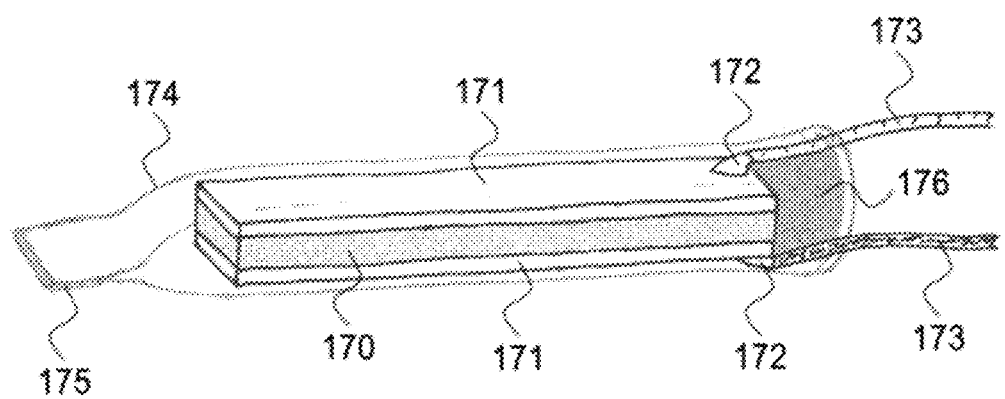
FIG. 15 illustrates the functional structure of a novel bend sensor developed for the Gesture Glove.

FIG. 15 illustrates the functional structure of a typical bend sensor 110, 111 used for detecting finger bend position in the Gesture Glove. This bend sensor is mounted over the Dorsal side of the Proximal Interphalangeal joint. The bend sensor is constructed with a core 170 of semi-conductive carbon infused resilient plastics, such as polyurethane or polyethylene porous substrate material, capable of being optionally impregnated with one or more of: ethanol, isobutane, propane, 1,1-difluroethane, powdered carbon and powdered graphite. Above and below the core 170, there are two thin, flexible electrically conductive plates 171 (made of a conductive and corrosion-resistant sheet material) that complete a conductive pathway over the entire upper and lower semi-conductor core surface. In an implementation, wider electrically conductive plates 171 are used for optimal sensing; a wide surface of contact with the electrically conductive layers reduces signal noise and overcomes local signal degradation caused by surface irregularities produced during the manufacturing process. The wide contact surface area also provides current pathway redundancy, fault tolerance, and greater accuracy and reproducibility between different batches of production units or sensors that have the same overall dimensions. Any known electrically conductive means of adhesion (such as brazing, welding, or soldering) 172 can be used to attach conductive wire leads 173 to the upper and lower electrically conductive plates 171. Polarity of applied current is interchangeable between the upper and lower electrically conductive plates 171. The electrically conductive plates 171 along with the core semi-conductive layer 170 and attached wire leads 173 are enclosed in a flexible and durable thin plastic sheathing 174. The sheathing is manufactured with a flat tapered region 175, which acts as the designated surface for fastening the sensor assembly to the rest of the Gesture Glove (any fastening means applied to region 175 will not induce compression of the core sensing areas 170 and 171). At the sensor end opposite to the region 175, the area where the wire leads 173 are exiting the sheathing 174 is sealed with a non-conductive epoxy glue seal 176, to prevent core slippage, and to provide an anchor point for the wire leads in order to prevent disconnection or fatigue at their respective attachment points 172 on the electrically conductive plates 171 from repeated movements. The epoxy seal 176 also serves as a second fastening surface for the bend sensor. Bending this sensor assembly in either direction along the length of the sensor will stretch and compress the semi-conductive material, increasing the conductive density, and reducing the resistance of the sensor assembly.

In some implementations, the carbon infused porous substrate may be further impregnated with electrical-resistance altering chemical additives such as ethanol, isobutane, propane, 1,1-difluroethane, powdered carbon, powdered graphite, etc.). To this end, the porous substrate may be impregnated by being soaked in various solutions or suspensions containing ethanol, isobutane, propane, 1,1-difluroethane, powdered carbon, powdered graphite, followed by low heat drying for one hour or more, such as 24 hours, so as to achieve various weight % levels of chemical additive impregnation. In some implementations, the porous substrate material has an absorptive sponge-like and absorptive consistency with high permeability to absorb the chemical solution.

In different implementations, materials and chemical concentrations can be adjusted to produce the desirable dynamic range for resistance change as needed. For example, a higher carbon deposition will produce higher conductivity and smaller dynamic range. Alternatively, a higher chemical additive deposition will produce higher resistance when material is not bent, and greater dynamic range during flexion. Thus, the range can be adjusted between unbent to bent flexion. For example, the maximum-minimum resistivity range may be about 30 k ohms to about 2 k ohms respectively in some implementations with approximately 10% chemical deposition within the porous substrate, and about 200 k ohms to about 5 k ohms respectively with 100% chemical deposition within the porous substrate in other implementations.

In operation, the sensor may be positioned in a wearable HMI device in proximity to a finger or hand joint or a muscle of a user of the HMI device, such that any motion of such joint or muscle causes deformation of the sensor, resulting in the sensor outputting directly to the MCU a respective analog signal representative of extent of the deformation. The analog signal varies because the bend sensor has a variable resistance that changes relative to the amount of bending or flexing of its physical components. In some implementations, a bend sensor (e.g., bend sensors 110 or 111) provides a full range signal (e.g., about 1 volt to about 3.3 volts) to communicate bend sensor position to a computing device such as a microcontroller (e.g., MCU 130 in FIG. 2). In some implementations, a bend sensor exhibits a wide resistance range from about 2,000 ohms at a 90 degree bend to about 30,000 ohms in a straight neutral position using a 1.5 mm thick, low-density, carbon infused polyurethane porous substrate 170 impregnated with chemical additives at 10% per weight. This range eliminates the need for external signal conditioning circuitry, permitting a bend sensor to directly interface with a microcontroller and thereby reduce latency. In some implementations, the bend sensor may operate at an applied source driving voltage as low as 3.3 volts.

Figure 16:
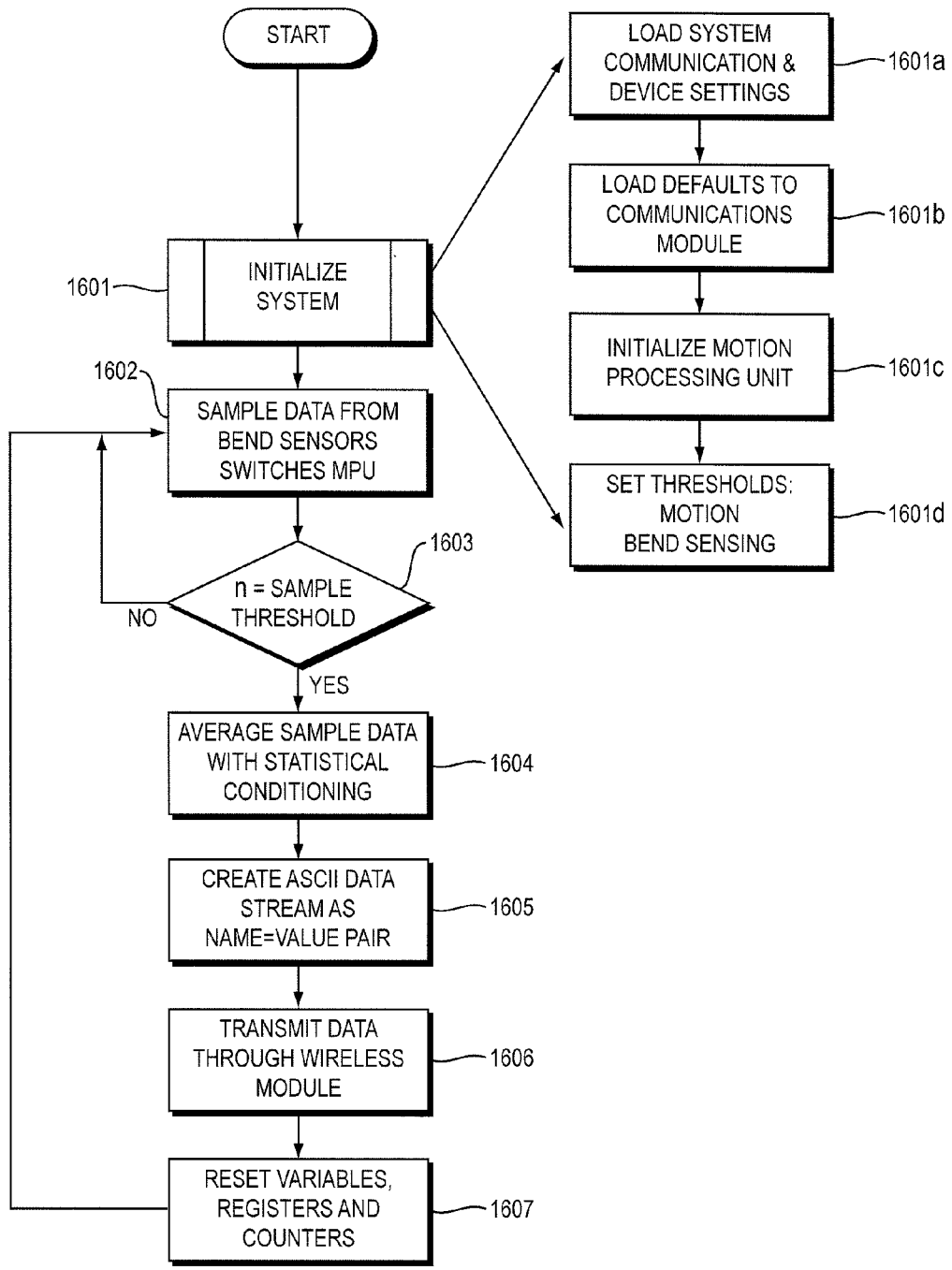
FIG. 16 is a flow diagram of the processing steps performed by the MCU of the Gesture Glove.

FIG. 16 is a flow diagram of the processing steps performed by the MCU of the Gesture Glove.

At step 1601, the MCU initializes the system. The system may include electronic modules such as (MPU, MCU, BATTERY, RFTX). Examples of initializing the system may include loading device settings or defaults for certain electronic modules and setting thresholds to determine when to communicate sensor data.

Steps 1601a-1601d describe a process for initializing a system according to at least one implementation of the invention. At step 1601a, the MCU loads system communication and device settings. At step 1601b, the MCU loads defaults to communications module. At step 1601c, the MCU initializes the MPU. At step 1601d, the MCU sets thresholds for motion sensors and for bend sensors. When a value generated by a motion sensor and a bend sensor exceeds the threshold set by the MCU, the MCU will transmit the sensor data measured by one or more sensors, such as a bend sensor) to another computing device.

At step 1602, the MCU samples data from one or more sensors, such as a bend sensor, pushbutton switch, miniature joystick or MPU. As discussed herein, the sensors may be configured to detect orientation and/or position and/or movement and/or flexion of a user and generate sensor data corresponding to such orientation and/or position and/or movement and/or flexion.

At step 1603, the MCU determines whether the sensor data meets predetermined transmission criteria by comparing the sampled data from each sensor to a threshold. If the sampled data does not exceed the threshold, the MCU returns to step 1602 and continues to sample data from the one or more electronic devices. If the sampled data exceeds the threshold, the MCU advances to step 1604. In some implementations, the MCU may sample data from all sensors when the sampled data from one or more sensors exceeds the threshold. By determining whether sensor data meets predetermined transmission criteria, the MCU can judiciously decide whether to transmit data or refrain from transmitting data. Transmitting data requires power and with the HMI operating on a fixed power supply to allow a user to have free range of movement, conserving power provides a better overall experience for the user.

At step 1604, the MCU averages the sampled data with statistical conditioning based on whether the MCU is operating in a low latency or high accuracy mode.

In a low latency mode, a single sensor to measure each specific orientation or movement of the user may be used. By using a single sensor, less processing time is required, meaning lower latency is realized overall by the system. In these implementations for low latency applications, the raw sensor data for gyroscopic, accelerometric, and magnetometric data may be associated on a one-to-one basis with a sensor output (one gyroscope, one accelerometer, one magnetometer) using any known filtering algorithms or fusion algorithms (e.g., a Kalman filter or a custom filter). The sensor data is then aggregated over multiple readings and time averaged to produce a steady output with very low drift and low noise. A low pass filter algorithm employed after the time-averaged data stream is sampled minimizes noise yielding very stable orientation and motion data that can be used to control a console application efficiently and accurately. Time-averaging prior to the low pass filtering is critical in achieving the high accuracy in output.

In a high accuracy mode, the MCU may receive sensor data from multiple redundant sensors (e.g., two or more accelerometers to measure the same linear direction or two or more gyroscopes to measure the same angular movement). Redundant sensors may be helpful because inertial sensors are prone to long-term drift, a type of noise that manifests itself in the sensor data. By averaging the sampled data from multiple redundant sensors, the MCU can reduce the amount of noise in the sampled data. For example, if the sampled data includes multiple samplings, it is possible that some of the samplings may have a substantial noise component. However, if other samplings have a limited noise component, the averaging of the samplings will reduce the overall noise component in the sampled data. By reducing noise, the electronic devices described herein can more easily process the desired signal component of the sampled data.

In some implementations, the multiple redundant sensors may be mounted at fixed and known distances relative to each other on a custom printed circuit board. The distances may be predetermined during circuit board fabrication. The sensor data from the multiple redundant sensors is used with each output being subjected to filtering methodology in a low latency mode, as described above. The positional and orientation data from each sensor is then considered with the known actual physical and orientation data to further eliminate drift, noise, and position for optimum accuracy. This configuration minimizes long-term drift and noise deviation because the actual distances and angles between sensors soldered on the MPU board are already known.

In a hybrid low-latency high-accuracy mode, the MCU may include a 20 Mhz to 50 Mhz processor. In this implementation, the high accuracy and low latency methods described above can be used with a nominal trade-off of higher battery consumption. In some implementations, multiple low frequency MCUs can be connected in tandem using I2C or SPI communication bus to collect and process data from each set of gyroscopes, accelerometers, and/or magnetometers to divide processing load and accomplish higher throughput with similar trade-off of higher battery consumption.

In some implementations, the processes performed by the MCU in steps 1603 and 1604 may be performed in reverse. In these implementations, the MCU averages the sampled data to reduce noise and then compares the sampled data to a threshold.

At step 1605, the MCU creates an ASCII data stream as a name=value pair of the sampled data from each sensor. In some implementations, the name corresponds to the electronic component (e.g., a bend sensor or push button switch) and the value corresponds to a human action or gesture measured by the electronic component. For example, "B0=H" where "B0" is the Push-button Switch 121 located on the Proximal Phalanx of the index finger mounted perpendicularly and "=H" represents the value of "B0" where "H" is the "pressed" button state. The value of zero (0) as in "B0=L" would mean the Push-button is not "pressed". In some implementations, each name and/or value is represented by 8 bytes per character. The use of an ASCII data stream and name=value pair is conducive to use of an application platform interface (API) to communicate with a console application. By using ASCII data, any developer programming a console application or similar electronic device can easily interpret and process this data format making the gesture processing system universal or device agnostic.

In some implementations, the MCU creates an encoded (e.g., compressed) data stream. In these implementations, each byte of sample data is encoded to a corresponding value for further processing and transmission to a console application. One of the benefits of encoding data is to reduce the amount of data transmitted between the glove and a console application, thereby improving gesture processing latency.

At step 1606, the MCU transmits sensor data from one or more sensors to a console application (i.e., a controllable device) using a wireless module (e.g., Radio Frequency Transmission Unit (RFTX) 132).

In some implementations, the MCU transmits the data as a data transmission packet. The data transmission packet is made up of i) standard ASCII characters describing named variables and their respective values or ii) encoded values corresponding to the sensor data. The full packet containing all data variables, including switches, bend sensors, and motion processing unit of the HMI, is then pushed through a Radio Frequency Transmission Unit (RFTX) 132, a Bluetooth or WiFi (IEEE 802.1) module.

In some implementations, the MCU transmits the sensor data from at least two (optionally, all) sensors to a console application if sensor data from at least one sensor exceeds a threshold as described in step 1603, thus achieving improved accuracy At step 1607, the MCU resets all variables, registers and counters stored in its memory and reverts back to step 1602 to continue sampling sensor data.

Figure 17:
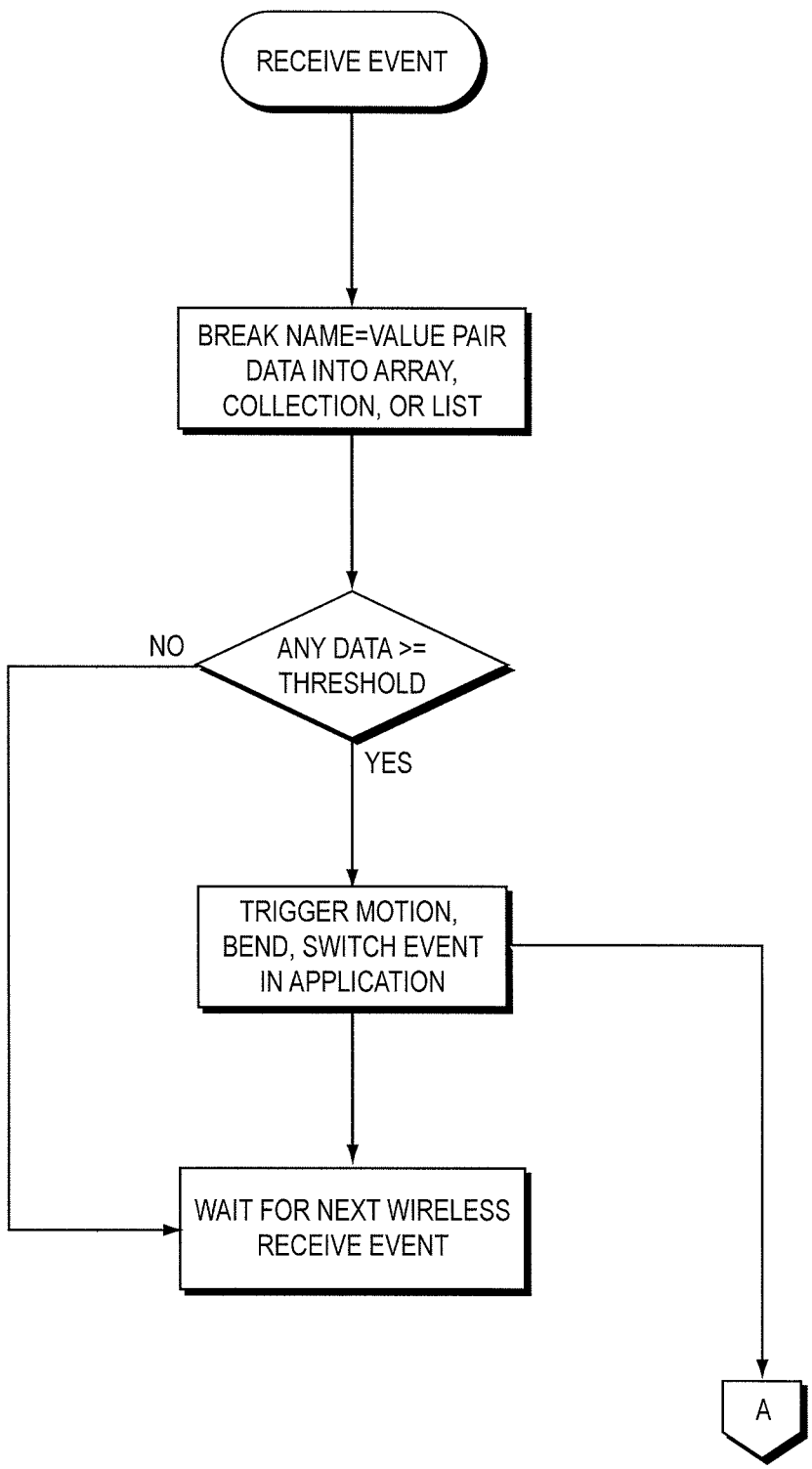
FIG. 17 is a flow diagram of the processing steps performed by the RF receiver device (e.g., console application or controllable electronic device).

FIG. 17 is a flow diagram of the processing steps performed by the RF Receiver Device (e.g., unmanned aerial vehicle, gaming console, controllable device, console application). FIG. 17 depicts the primary layer, class, or process to intercept data from the Gesture Glove. This layer can be used on any electronic or computing device. The output of this layer is represented by "A" at the bottom of FIG. 17 which is an event forwarded to higher layers or encapsulating classes. Name value pairs are converted into arrays or lists that are looped through and parsed to assess the variable states, such as Pushbutton Switches 120, 121, 122, Bend Sensor Positions 110, 111, as well as hand-orientation and movement (MCU) 131. If any variables exceed their given threshold, an event "A" is raised for higher-layer applications of encapsulated classes; such as Gesture Control applications and Mouse Control applications described in FIGS. 18 and 19 respectively. By processing data by the RF Receiver Device, the MCU requires less processing power to operate, thereby preserving battery power. Also, the RF receiver device may have faster processing capabilities, thereby reducing latency by interpreting gesture commands at the receiver device as compared to interpreting gesture commands at the MCU. However, it is contemplated that, in some alternative implementations, such as that shown in FIG. 20b, it is the MCU that processes the sensor data, interprets the gestures and generates gesture commands. In such implementations, the MCU transmits the gesture command to the RF receiver device. The gesture commands, when executed by a console application, cause the console application to perform an action (e.g., cause an unmanned aerial vehicle to perform a barrel roll). The MCU may use similar techniques as described in step 1605 and step 1606 above (e.g., ASCII name=value pair or compression encoding techniques) to transmit the gesture commands to the RF receiver device.

Figure 18:
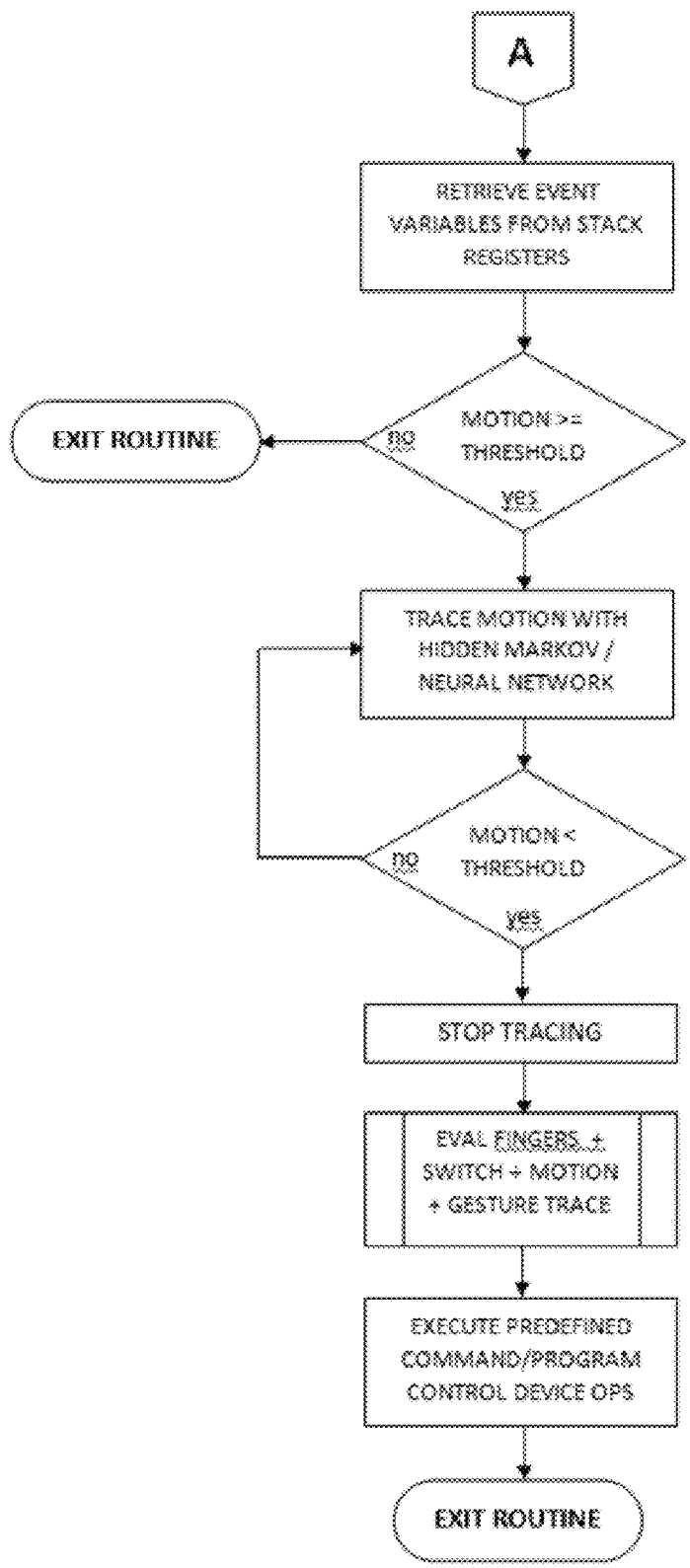
FIG. 18 is a generalized representation of the processing steps to extract the individual gesture positions and hand orientation by the receiver device.

FIG. 18 is a generalized representation of the processing steps to extract the individual gesture positions and hand orientation in an implementation of this invention. The event received from the output "A" as described in FIG. 17, is assessed for values exceeding a threshold limit for each variable. If the values are below the threshold, then the process terminates or exits in FIG. 18. If the threshold is exceeded, then the ongoing inputs subsequent to that trigger are stored in memory up until the moment the values fall below the threshold for the given variable. Subsequently, the data collected is traced and subjected to a pattern recognition algorithm, such as Hidden Markov Model or a Neural Network with integrated Fuzzy Logic, the output of which identifies a said motion that triggers an action, macro, stored procedure, program, etc.

Figure 19:
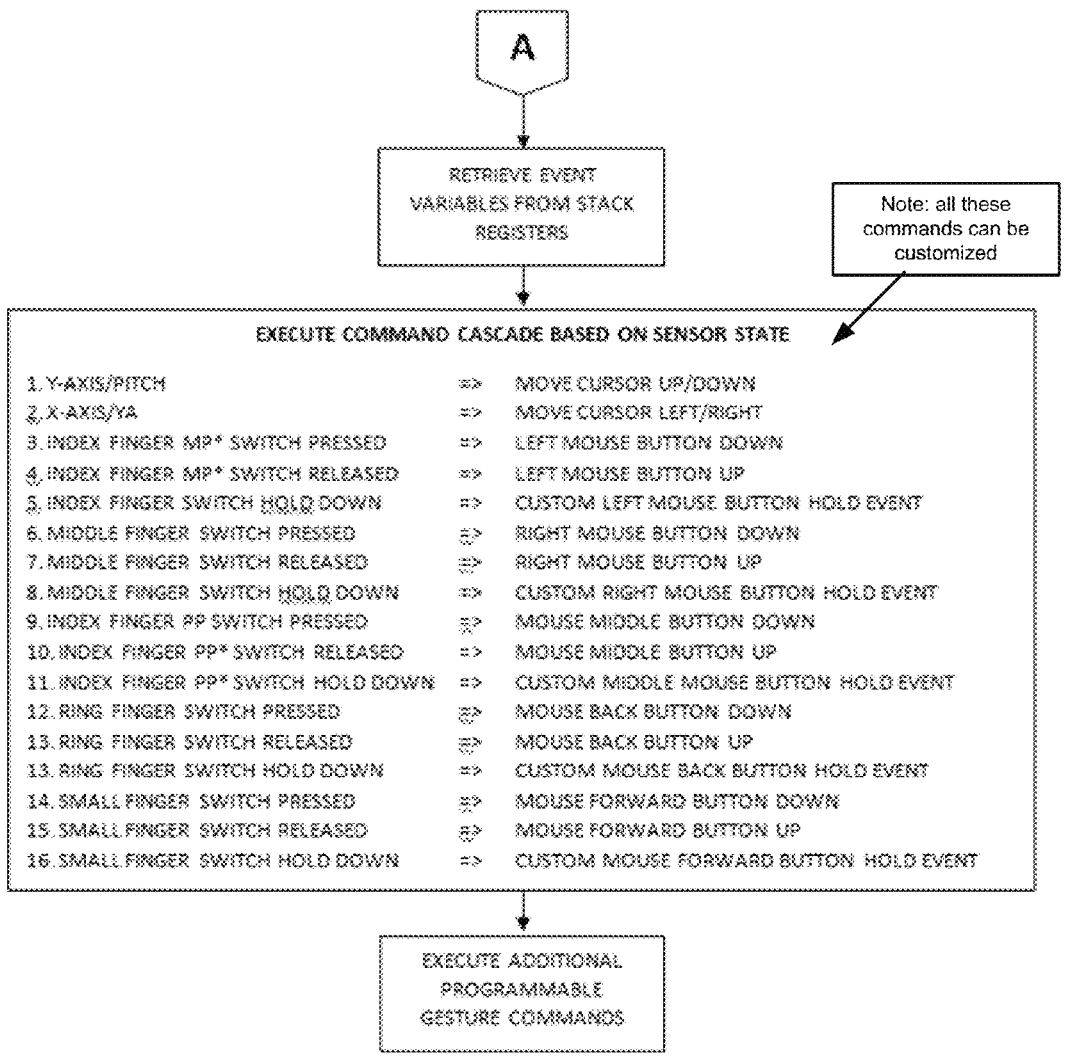
FIG. 19 is a flow diagram of the processing steps performed by an application for Mouse & Joystick control by the receiver computer.

FIG. 19 is a flow diagram of the processing steps performed by an application for Mouse & Joystick control. The event received from the output "A" as described in FIG. 17 is parsed for hand-orientation and motion that are converted into Mouse movements and Pushbutton states that emulate various Mouse-button states in the operating system of the receiver computer.

In more detail, still referring to the invention of FIGS. 1-19, the Gesture Glove uses wireless transmission to control electronic devices using multiple methods. In an implementation, there are three methods of controlling a device wirelessly through the Gesture Glove. Firstly, the bend orientation of fingers 110 and thumb 111 can be used as an input method to control a wirelessly connected device. Secondly, embedded switches 120 or alternate user controls (e.g., a joystick or capacitive touch pad) can be used to control a linked device. Thirdly, the hand orientation and motion (MPU) 131 can also be used as gestural control parameter. Furthermore, any combination of these three methods can be used for a plurality of additional gesture controls. This novel mixture of input methods combined with a new and universal data-transmission packet, described in detail below, makes the Gesture Glove a unique solution as a multi-functional human-machine interface device.

One of the most distinct and unique functional features of the Gesture Glove is the method in which the Bend Sensor 110 functions. In some implementations, four (4) Bend Sensors 110 measure the bend position of the four (4) fingers at the Proximal Interphalangeal joint 102 on the dorsal side of each finger. The fifth (5th) Bend Sensor 111 is placed between the thumb and the index finger. When the fingers are straight (not bent) the sensors are not compressed; therefore, the conductive density of core material 170 is lowest and resistance of the sensor is highest in pathway current flow pathway between the two (2) electrically conductive plates 171. This resistance, depending on the bend position, and varying between 5,000Ω (90 degree bend) to 200,000Ω (straight, un-bent position), is sampled and averaged over several readings in the time-order of microseconds and relayed to the wireless receiver device through the wireless Radio Frequency Transmission Unit (RFTX) 132.

A second method of control that the Gesture Glove implements is through the use of Push-button Switches 120. The Microcontroller Unit (MCU) 130 monitors and relays two (2) states (ON or OFF) of the Pushbutton Switches 120 to a given wireless receiving device during a data-packet transmission.

A third distinct method of control that the Gesture Glove utilizes is through the use of hand orientation and motion. To facilitate this, an inertial Motion Processing Unit (MPU) 131 is used to measure the static G-Force on the XYZ axis. These values are read and transmitted by the Microcontroller Unit (MCU) 130 as the tilt-orientation of the hand to the wireless receiver device within a wireless data-packet transmission. The spatial motion of the hand is measured using the same MPU 131. A movement in any axial plane causes inertial force on the MPU 131 that is also read and relayed by the MCU 130 within a wireless data-packet transmission. For gesture detection, the Gesture Glove is configurable to perform the following:
  i) static positional gesture detection, such as detecting a value of 5 units (five minutes or five points) when the user raises and holds still his be-gloved hand with all his five fingers spread apart;
  ii) simplistic movement gesture detection, such as interpreting a simple motion of the hand in the air to mean swatting, or throwing, or "crossing out:"
  iii) combined gesture detection, such as assigning a certain meaning to a certain movement of the hand performed while simultaneously holding the fingers in a certain position.

To measure orientation and spatial motion of the hand, the MPU 131 may include one or more sensors such as magnetometers, gyroscopes, inertial sensors, accelerometers and electro-myograms. The magnetometers may measure the orientation of a body part of a user relative to the Earth's magnetic field. The gyroscopes may measure changes in angular orientation of a body part of a user in one or more axes. The accelerometers may measure changes in movement of a body part of a user in one or more (e.g., three) axes. The electro-myograms may measure electrical signals produced during muscle contractions by a user. The MPU 131 may be configured to detect tension or stress levels on the skin of the user and encode the sensor data to correspond to a general configuration of the body part (e.g., hand) of the use. In such configurations, the MPU 131 may detect tension on the palm of the user, or detect if a hand of a user is in a first or has fingers extended.

In some implementations, the MPU 131 may include redundant pairs (e.g., two, four, six) of sensors, such as magnetometers, gyroscopes, accelerometers and electro-myograms. In these configurations, the MPU 131 may reduce sensor noise by incorporating redundancy and averaging the sensor data from groups of redundant sensors. By averaging the sensor data from groups of redundant sensors, anomalous noise found in one sensor can be minimized by averaging the sensor data with anomalous noise with sensor data from properly functioning sensors.

In some implementations, the MPU 131 may include a multi sensor array to reduce drift or inaccuracies/noise in the sensor data that accumulates over time.

In some implementations, the MPU 131 is a custom printed circuit board having an array of sensors. In some implementations, the MPU 131 includes a multi-master, multi-slave, single-ended, serial computer bus to transmit data between sensors and the MCU 130. The MCU 130 may process sensor data from the MPU 131 using the I2C protocol developed by Philips Semiconductor®. In some implementations, each sensor is addressable and the bus contains two outputs, a clock signal and the sensor data. At each clock cycle, the MCU 130 samples one bit of data from each sensor until all sensor data is sampled. Then, the MCU 130 repeats the sampling process.

Once a data-packet is received by the wireless receiver device, it is subjected through a cascade of processing layers, each designed to couple or decouple compatibly, making the Gesture Glove universally adaptable for a broad range of field application with minimal add-on electronics or computational power. FIG. 17 describes a process for intercepting the data-packet and pre-processing the values of each variable transmitted by the Gesture Glove before being passed on to higher layers of processing. This method establishes a base layer for communication that can be standardized in a form of software class, importable into encapsulating classes that used the standard procedures of the primary layer to intercept the Gesture Control data and build more complex control applications. As an example, a higher level class or procedure is described in FIG. 18 to detect a predefined gesture or hand movement to trigger a program, method, macro, etc. further up the chain. Another application for mouse control is described in FIG. 19. Data received by the computer via Bluetooth, radio frequency (e.g., amplitude modulation, frequency modulation, phase modulation) or WiFi is parsed and converted to represent positional X, Y values for the mouse, as well as the button state can be mapped to emulate mouse movements and clicks on the resident Operating System of the computer. Additionally, the gesture control application and mouse control application can be cascaded together to create even more robust applications with a multiplicity of controls through combinatorial use of finger, switch, and motion sensors in the Gesture Glove. Moreover, Left-Hand and Right-Hand Gloves can be used in concert for even greater control of the receiver device.

In further detail, still referring to the invention of FIGS. 1-19, the Gesture Glove can be made in several commercial sizes (e.g., Small, Medium, and Large) to fit the most common hand size ranges for adults and children.

With the optional use of compression fit materials of improved elasticity, it can be possible to produce the Gesture Glove in just several pre-set sizes that would still cover most hand sizes of potential users.

As to its construction, any suitable glove making technique known in the art can be used to assemble the Gesture Glove. In one implementation of this invention, as shown in FIGS. 1-19, is assembled in layers to make the Gesture Glove thin, durable, and practical. Beginning with the first (innermost) layer, the inner lining 100 is made of a soft and comfortable blend of cotton or polyester or any other suitable material. Mounted on top of the inner lining 100, there are bend sensors 110, 111, pushbutton switches 120, 121, 122, and their respective power and communication wiring 112, 113, 123, 124. A layer of felt-type material 140 (or any other suitable material) is introduced above this wiring layer for isolation and protection for the electronics layer to follow. A slit, orifice or cut-out 141 is made in the centre of this felt-type material 140 to allow lower stratum wiring to emerge on the electronics layer placed on top of the felt-type material as shown in FIG. 9. Microcontroller Unit (MCU) 130, Motion Processing Unit (MPU) 131, Radio Frequency Transmitter (RFTX) 132 and Battery 133, with their respective communications and power wiring are located in the electronics layer. The electronics and the bend sensors are then covered with another layer of felt-type material (applied in areas 150, 151, 152 of FIG. 10) to protect them against physical damage during use and to provide a smooth contour or finish to the glove by dampening any protrusions caused by the electronics, sensors, switches, and wiring. Finally, a compression fit material in the form of a glove is placed on top of all layers below to create a finished glove. In one implementation, the flexibility and feel of the final glove assembly are very close to an off-the-shelf high quality, high-performance glove with a snug fit. In another implementation, a custom-fabricated scaffolding, inner skeleton or exo-skeleton may be fitted to the Gesture Glove or may replace one or more or all layers of the Gesture Glove, so as to provide support for the electronic components affixed to it. In yet another implementation, the electronic components of this invention may be directly and/or individually attached to the fingers, thumb, palm or back-of-the-hand of the user by any known means, with or without one or more covering layer(s) resembling a garment glove.

The advantages of various implementations of the present invention include, without limitation, its plug & play capability owing to its standard protocol and base class software. The Gesture Glove provides, in its various implementations, multiple control inputs permitting hundreds of distinct gestures. The ASCII data-packet transmission implementation allows rapid and easy development of applications that can use the Gesture Glove as the input interface to a large variety of devices. The slim, flexible appearance gives the user a feeling of wearing a regular glove. Some implementations employ similar data processing principles and components in different wearable HMI device form factors, such as a fingerless glove, a sleeve that fits around one or multiple fingers or around another body part, such as one or more of a wrist, forearm, elbow, ankle, foot or calf.

In some implementations, the present invention is a wearable device which enable its users the ability to interface with electro-mechanical and electronic devices in a more dynamic and natural way.

Figure 20A:
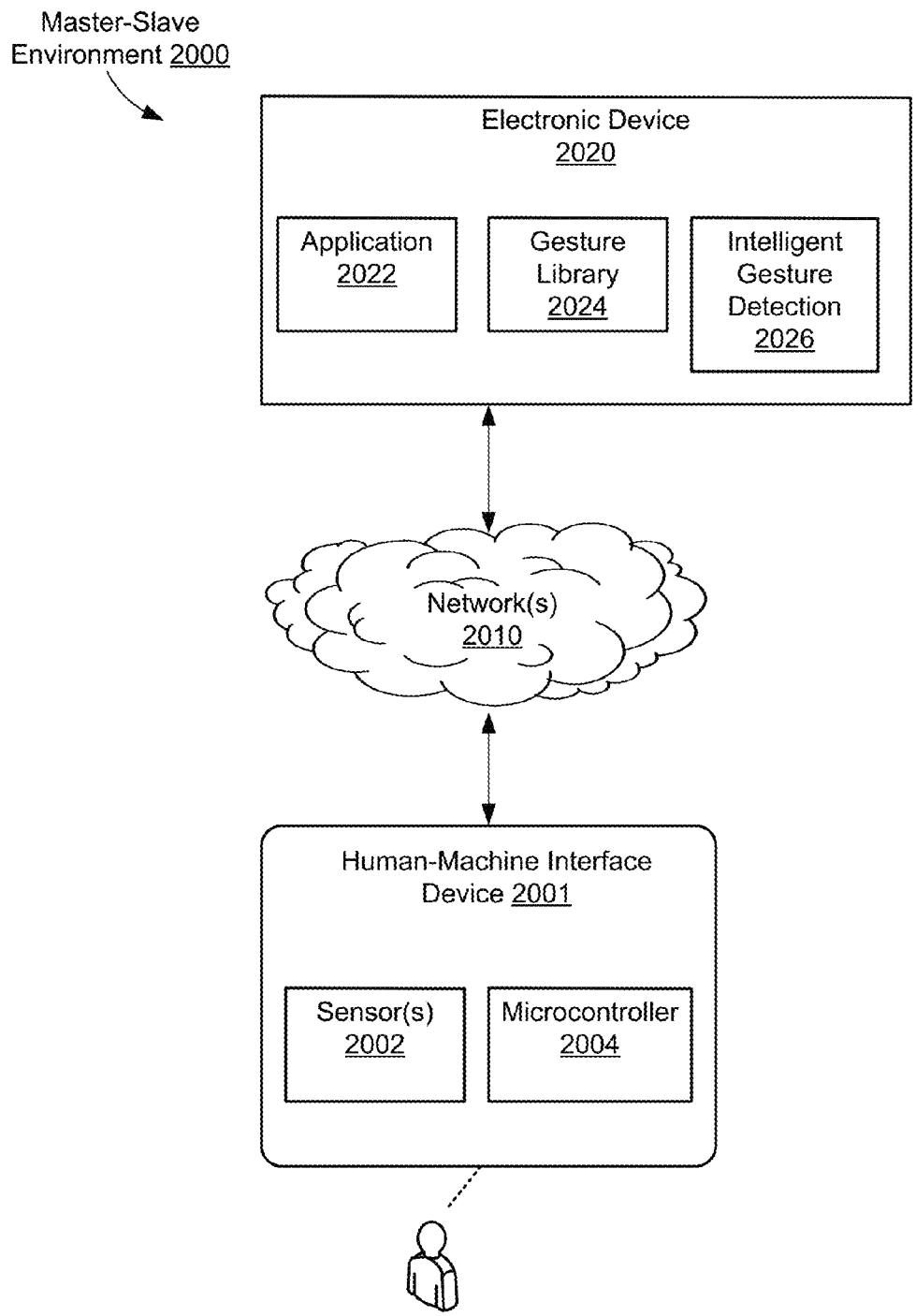
FIG. 20a is a block diagram of a wearable human machine interface (HMI) device of which the Gesture Glove is an implementation and an electronic device controllable by the wearable HMI device.

FIG. 20a is a block diagram of master-slave environment 2000 including a wearable human machine interface (HMI) device 2001 of which the Gesture Glove is an implementation and an electronic device 2020 controllable by the wearable HMI device in accordance with some implementations. In some implementations, the master-slave environment 100 includes an HMI device 2001 (e.g., Gesture Glove) coupled to an electronic device 2020 (e.g., an unmanned aerial vehicle, a console application, an RF receiver device) and communication network(s) 2010 for interconnecting these components. Examples of the one or more networks 2010 include local area networks (LAN) and wide area networks (WAN) such as the Internet. The one or more networks 2010 are, optionally, implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some implementations, the HMI device 2001 includes sensor(s) 2002 and/or a microcontroller 2004. The sensor(s) 2002 is configured to detect orientation and/or position and/or movement and/or flexion of the user (i.e., a gesture) and generate sensor data corresponding to the orientation and/or position and/or movement and/or flexion. The microcontroller 2004 is configured to sample sensor data from sensor(s) 2002 and determine whether to transmit the sensor data or corresponding gesture control data to the electronic device 2020. As described herein, the microcontroller 2004 can be configured to operate in different modes, such as a low latency mode and a high accuracy mode, and transmit control data to the electronic device 2020 based on the mode. The control data is data that, when processed by the electronic device 2020, causes the electronic device 2020 to perform an action (e.g., perform a mouse click function or steer an unmanned aerial vehicle).

Figure 20B:
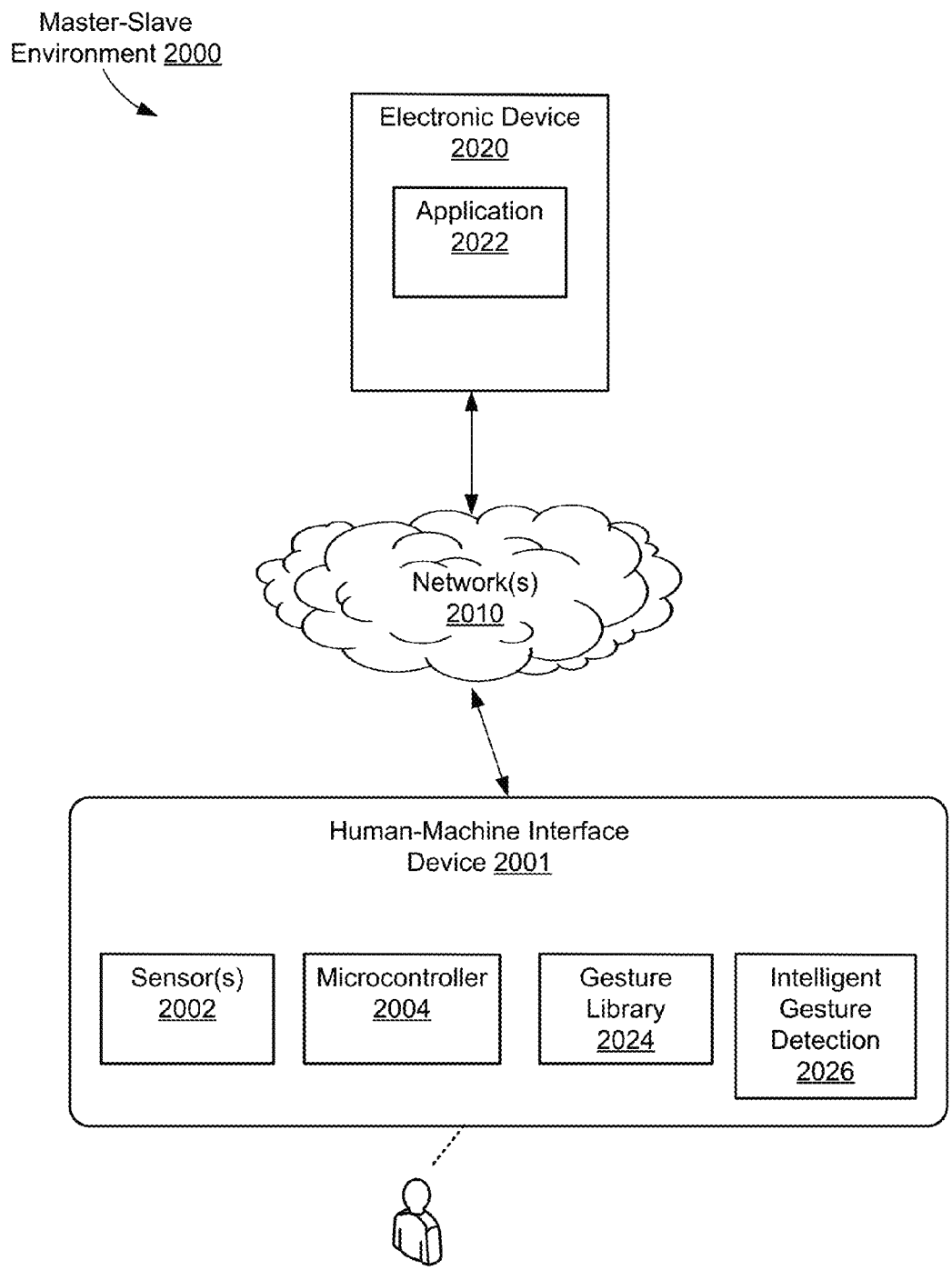
FIG. 20b is a block diagram that depicts an implementation similar to FIG. 20a, but with the Gesture Library and Gesture Detection located on the HMI (as opposed to FIG. 20a where the Gesture Library and Gesture Detection are located on the controllable device itself).

In some implementations, the electronic device 2020 can include an application 2022 and/or a gesture library 2024, and/or an Intelligent Gesture Detection algorithm 2026. The application 2022 is configured to process the control data received from the HMI device 2001 and execute a command that causes the electronic device 2020 to perform an action. In some implementations, the control data is sensor data. In these implementations, the application 2022 analyzes the sensor data and retrieves a gesture command from the gesture library 2024 based on the sensor data. The gesture library 2024 is a database of gesture commands that correlate to sensor data. An example of a gesture library 2024 is shown in FIG. 19 in the section titled "EXECUTE COMMAND CASCADE BASED ON SENSOR STATE". The Intelligent Gesture Detection algorithm 2026 allows the intelligent detection of a gesture even when the gesture library 2024 does not have any pre-set gesture commands that correlate to sensor data; instead, new gestures can be detected by intelligent processing, guessing and/or calculation on-the-fly. As shown in FIGS. 20a and 20b, the Gesture Library and the Intelligent Gesture Detection can reside either on the controlled device itself (as in FIG. 20a) or on the HMI device (as in FIG. 20b).

In some implementations, the control data transmitted from the HMI device 2001 is a gesture command. In these implementations, the gesture library 2024 may exist on the HMI device 2001. In these implementations, the microcontroller 2004 may analyze the sensor data and retrieve a gesture command from the gesture library 2024 based on the sensor data. Once the gesture command is transmitted to the electronic device 2020, the application 2022 executes the command and causes the electronic device 2020 to perform an action.

Figure 21:
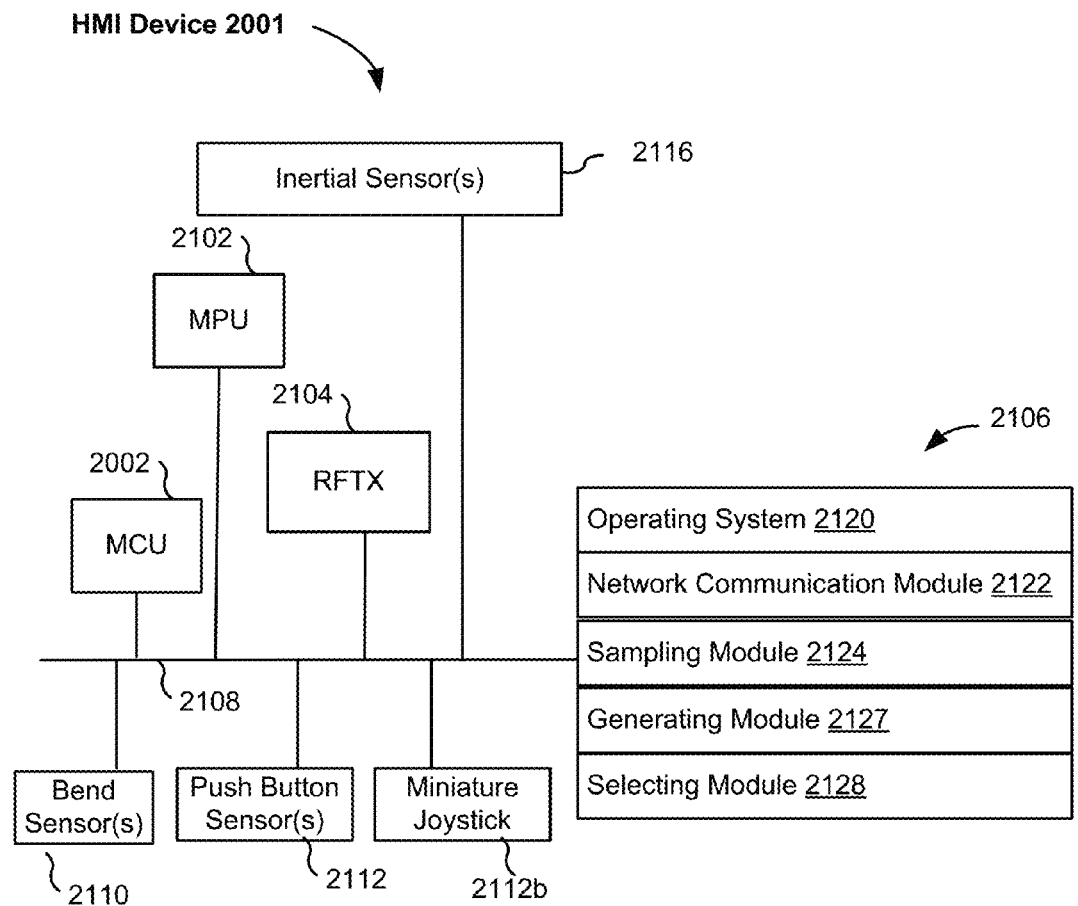

FIG. 21 is a block diagram showing functional details of the wearable HMI device 2001 of FIG. 20a.

In some implementations, the HMI device 2001 includes control processing units CPU(s) such as the microcontroller 2002 (i.e., MCU) shown in FIG. 20, an MPU 2102, one or more network interfaces or other communications interfaces 2104 (e.g., RFTX), user interface 2110, memory 2106, and one or more communication buses 2108 for interconnecting these components. Communication buses 2108 may include circuitry (sometimes called a chipset) that interconnects and controls communications between system components.

In some implementations, the HMI device 2001 includes one or more motion sensors 2116, which directly or indirectly determine the orientation and movement of a body part of the user. In some implementations, the location/motion sensors 316 include, but are not limited to, gyroscopes, accelerometers, and GPS devices. In some implementations, the HMI device 2001 may also include one or more bend sensors 2110, which determine the flexion of a body part of the user. In some implementations, the HMI device 2001 may also include one or more push button sensor(s) 2112, which detect user-initiated push of a button. The sensor data produced by any of the above sensors, in any combination, may be used by the HMI device 2001 to track user gestures and control the electronic device 2020 based on gesture commands that correspond to the tracked user gestures.

Memory 2106 includes high-speed random access memory, such as DRAM, SRAM, DDR RAM or other random access solid state memory devices; and optionally includes non-volatile memory, such as one or more magnetic disk storage devices, optical disk storage devices, flash memory devices, EPROM, EEPROM or other known non-volatile solid state storage devices. Memory 2106 optionally further includes one or more storage devices remotely located from the CPU(s) 2002 (e.g., cloud storage). Memory 2106, or alternately the non-volatile memory device(s) within memory 2106, comprises a non-transitory computer readable storage medium. In some implementations, memory 2106 or the computer readable storage medium of memory 2106 stores the following programs, modules and data structures, or a subset or superset thereof:
  operating system 2120, which includes procedures for handling various basic system services and for performing hardware dependent tasks;
  network communication module 2122 (or transmitting module), which is used for connecting the HMI device 2001 to electronic device 2020 via the e.g., RFTX 2104 (wired or wireless) and one or more networks 2010 (FIG. 20a), such as the Internet, other wide area networks, local area networks, metropolitan area networks, and so on;
  sampling module 2124 for sampling the sensor data from the plurality of sensors 2216, 2110 and 2112;
  determining module 2126 for determining whether the sensor data from one of the plurality of sensors meets transmission criteria;
  generating module 2127 for generating control data based on the sensor data from a portion of the plurality of sensors when operating in the low latency mode and generating control data based on the sensor data from all of the plurality of sensors when operating in the high accuracy mode; and
  selecting module 2128 for selecting a gesture command to the controllable device based on the sensor data from the plurality of sensors.

Each of the above identified elements may be stored in one or more of the previously mentioned memory devices of the HMI device 2001, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 2106, optionally, stores a subset of the modules and data structures identified above. Furthermore, memory 2106, optionally, stores additional modules and data structures not described above.

Figure 22:
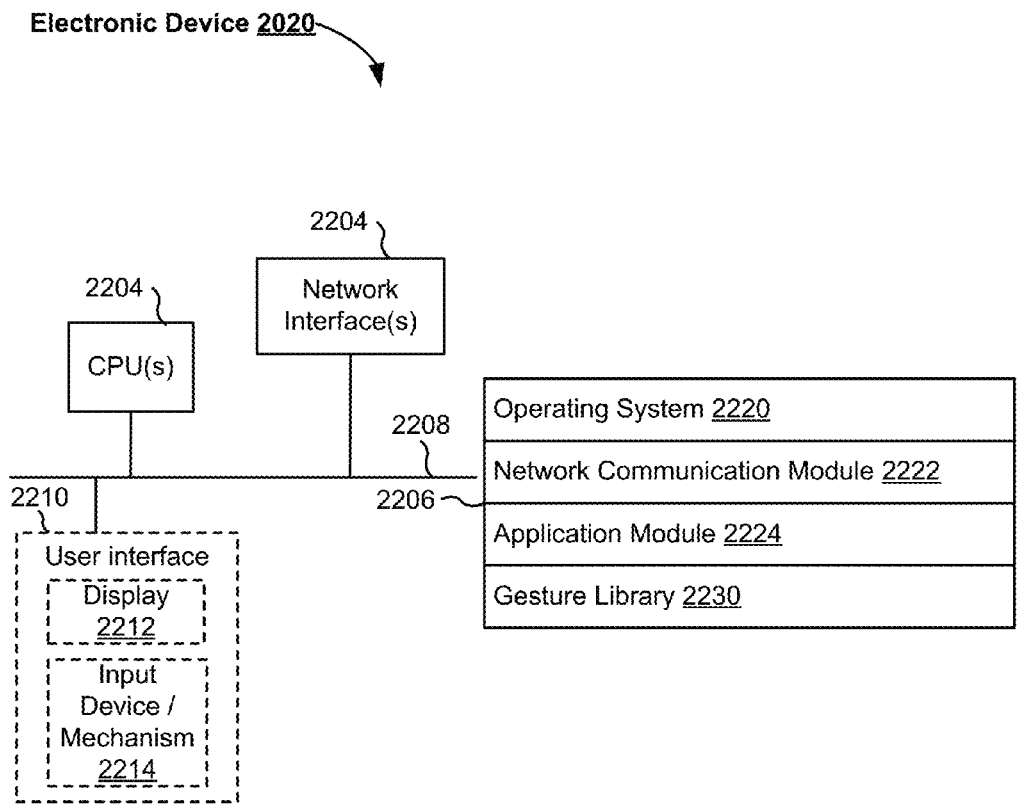

FIG. 22 is a block diagram showing functional details of an electronic device 2020 controllable by the wearable HMI device 2001 of FIG. 20a. In some implementations, the electronic device 2020 includes one or more processing units (CPUs) 2204, one or more network interfaces or other communications interfaces 2204, memory 2206, and one or more communication buses 2208 for interconnecting these components. Communication buses 2208 may include circuitry (sometimes called a chipset) that interconnects and controls communications between system components.

In some optional implementations, the electronic device 2020 also includes an user interface that presents a graphical user interface (GUI) using one or more output devices and receives user inputs via one or more input devices. In some optional implementations, the electronic device 2020 includes a user interface 2210 comprising zero or more display devices 2212 (e.g., a screen or monitor) and zero or more input devices or mechanisms 2214. The one or more output devices, optionally including one or more visual displays and optionally including one or more speakers, enable presentation of media content by the electronic device 2020. In some implementations, the one or more input devices include user interface components that facilitate user input, such as a keyboard, a mouse, a voice-command input unit or microphone, a touch screen display, a touch-sensitive input pad, a camera, a gesture capturing camera, and/or other input buttons or controls, and optionally include two or more of such input devices. Furthermore, the electronic device 2020 may use a microphone and voice recognition, or a camera and iris/face recognition to supplement or replace a physical or virtual keyboard.

Memory 2206 includes high-speed random access memory, such as DRAM, SRAM, DDR RAM or other random access solid state memory devices; and optionally includes non-volatile memory, such as one or more magnetic disk storage devices, optical disk storage devices, flash memory devices, EPROM, EEPROM or other known non-volatile solid state storage devices. Memory 2206 optionally further includes one or more storage devices remotely located from the CPU(s) 2204 (e.g., cloud storage). Memory 2206, or alternately the non-volatile memory device(s) within the memory 2206, comprises a non-transitory computer readable storage medium. In some implementations, the memory 2206 or the computer readable storage medium of the memory 2206 stores the following programs, modules and data structures, or a subset or superset thereof:
  operating system 2220, which includes procedures for handling various basic system services and for performing hardware dependent tasks;
  network communication module 2222, which is used for connecting electronic device 2020 to HMI device 2001 via the one or more communications network interfaces 2204 (wired or wireless) and one or more networks 2010 (FIG. 20a), such as the Internet, other wide area networks, local area networks, metropolitan area networks, and so on;
  application module 2224 for analyzing sensor data (i.e., control data) from HMI device 2001 to determine a corresponding gesture command and/or executing gesture commands to cause electronic device 2020 to perform an action;
  gesture library 2230 for storing gesture commands and corresponding sensor data and processing requests for gesture commands from application module 2224.

Each of the above identified elements may be stored in one or more of the previously mentioned memory devices of the electronic device 2020, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 2206, optionally, stores a subset of the modules and data structures identified above. Furthermore, memory 2206, optionally, stores additional modules and data structures not described above.

In some implementations, at least some of the functions of the electronic device 2020 are performed by the HMI device 2001, and the corresponding sub-modules of these functions may be located within the HMI device 2001. Furthermore, in some implementations, at least some of the functions of the HMI device 2001 are performed by the electronic device 2020, and the corresponding sub-modules of these functions may be located within the electronic device 2020. The HMI device 2001, and the electronic device 2020 shown in FIG. 20 are merely illustrative, and different configurations of the modules for implementing the functions described herein are possible in various implementations.

It is contemplated that, using the devices and techniques described herein, a user can employ any of the control modalities (buttons, fingers, motions, sensors, switches, miniature joysticks, etc.) of HMI device 2001 to define hundreds of custom gestures and implement hundreds of custom gesture commands that cause the electronic device 2020 to perform an action, when executed. This is possible due to the precision allowed by the disclosed processing techniques, redundant sensors and/or accuracy the disclosed flex sensors, among other reasons.

To create custom gestures, a gesture glove console application executed on the HMI device or another electronic device can be placed into a learning mode, during which repeated trials of a custom gesture are performed by the user/operator wearing the gesture glove.

In current best-case applications using industry standard pattern recognition algorithms, approximately one hundred trials of same gesture pattern are required to establish a good statistical data set for a given custom gesture in order to reduce data variance and estimate a proper decision boundary for reuse of the gesture pattern in a field application. These techniques are still under research and development.

The gesture glove console application, in contrast, requires less than ten training repetitions for custom gestures to be properly recognized by the pattern recognition algorithm. This is accomplished by an algorithm or equation that uses weighted statistical measures including a combination of partial algorithms from K-Nearest Neighbors, Dynamic Time Warping, Support Vector Machines, and Non-Linear Correlation infused in a new calculative methodology that enables a better prediction of a decision boundary with fewer training sets for a custom gesture. The predictive output from this methodology can be used directly for low latency applications, or further subjected to additional recognition layers such as neural networks, decision trees, or hidden Markov for high accuracy applications.

Once the custom gesture is appended to the gesture library, the gesture library can be used from the console application or uploaded to the gesture glove MCU for direct field use.

In one implementation, there is a wearable gesture control interface apparatus for controlling a controllable device based on gestures provided by a user, said wearable gesture control interface apparatus including: a plurality of sensors configured to detect one or more parameters of the user, including orientation, movement, position, flexion, and generate sensor data corresponding to said one or more parameters of the user; and a microcontroller configured to: sample, using a sampling module, the sensor data from the plurality of sensors; determine, using a determining module, whether the sensor data from one of the plurality of sensors meets transmission criteria; and in accordance with a determination that the sensor data from the one of the plurality of sensors meets the transmission criteria, transmit, using a transmitting module, control data corresponding to all of the plurality of sensors to the controllable device.

In a further implementation, the transmission criteria is met when the sensor data from the one of the plurality of sensors exceeds a threshold.

In a further implementation, the control data includes the sensor data from the plurality of sensors.

In a further implementation, the control data includes gesture commands that, when executed by the controllable device, cause the controllable device to perform an action.

In a further implementation, the microcontroller is further configured to select, using a selecting module, a gesture command to the controllable device based on the sensor data from the plurality of sensors.

In a further implementation, the plurality of sensors and the microcontroller are configured to mount to a glove attachable to a hand of the user.

In one implementation, there is a method for controlling a controllable device based on gestures provided by a user, including: in a wearable gesture control interface apparatus having a microcontroller, a plurality of sensors, one or more functional modules and a memory storing programs for execution by the microcontroller: performing operations of the wearable gesture control interface apparatus of any of the above implementations.

In one implementation, there is a non-transitory computer readable storage medium including a memory for use in a wearable gesture control interface apparatus having a microcontroller, a plurality of sensors and one or more functional modules, the memory storing programs that, when executed by the microcontroller, cause the wearable gesture control interface apparatus to operate as set out in any of the above implementations.

In one implementation, there is a wearable gesture control interface apparatus for controlling a controllable device based on gestures provided by a user, said wearable gesture control interface apparatus including a plurality of sensors configured to detect one or more parameters of the user, including orientation, movement, position, flexion, and generate sensor data corresponding to said one or more parameters of the user; and a microcontroller operable in a low latency mode and a high accuracy mode, the microcontroller configured to: sample, using a sampling module, the sensor data from the plurality of sensors; generate, using a generating module, a sensor output based on the sensor data from a portion of the plurality of sensors when operating in the low latency mode; and generate, using the generating module, a sensor output based on the sensor data from all of the plurality of sensors when operating in the high accuracy mode.

In a further implementation, generating the sensor output includes averaging the sensor data from the plurality of sensors to minimize a noise component in the sensor data.

In a further implementation, each of the plurality of sensors that comprise the portion of the plurality of sensors has a different function and wherein at least two of the plurality of sensors are configured to measure an identical orientation or movement.

In a further implementation, a number of plurality of sensors is user-selectable after the plurality of sensors are connected to a microcontroller.

In a further implementation, each of the plurality of sensors are separated on a circuit board at fixed predetermined distances relative to another of the plurality of sensors.

In a further implementation, the microcontroller generates the sensor output based on the fixed predetermined distances separating the plurality of sensors.

In one implementation, there is a method for controlling a controllable device based on gestures provided by a user, including in a wearable gesture control interface apparatus having a microcontroller, a plurality of sensors, one or more functional modules and a memory storing programs for execution by the microcontroller: performing operations of the wearable gesture control interface apparatus of any of the above implementations.

In one implementation, there is a non-transitory computer readable storage medium including a memory for use in a wearable gesture control interface apparatus having a microcontroller, a plurality of sensors and one or more functional modules, the memory storing programs that, when executed by the microcontroller, cause the wearable gesture control interface apparatus to operate as set out in any of the above implementations.

In one implementation, there is a sensor for measuring flexing or bending of an object, including a first flexible electrically conductive plate and a second flexible electrically conductive plate; a flexible semi-conductive porous substrate disposed between and contacting the first and second electrically conductive plate, wherein a resistance of the semi-conductive porous substrate varies based on an amount of flexion of the semi-conductive porous substrate; a first lead connected to the first flexible electrically conductive plate, the first lead configured to receive a drive signal from a microcontroller, the drive signal being altered based on the resistance of the semi-conductive porous substrate to generate an output signal; and a second lead connected to the second flexible electrically conductive plate, the second lead configured to transmit the output signal directly to the microcontroller without requiring additional signal conditioning.

In a further implementation, the semi-conductive porous substrate has a variable resistance of about 1,000 ohms to about 30,000 ohms based on the amount of flexion of the semi-conductive porous substrate.

In a further implementation, the semi-conductive porous substrate has a variable resistance of about 5,000 ohms to about 200,000 ohms based on the amount of flexion of the semi-conductive porous substrate.

In a further implementation, the semi-conductive porous substrate has a variable resistance of about 50,000 ohms to about 1,000,000 ohms based on the amount of flexion of the semi-conductive porous substrate.

In a further implementation, the output signal has a range of about 1 volt to about 4 volts.

In a further implementation, the output signal has a range of about 1.25 volts to about 3.73 volts.

In a further implementation, the sensor is positioned in a wearable HMI device in proximity to a finger or hand joint or a muscle of a user of the HMI device, such that any motion of such joint or muscle causes deformation of the sensor, resulting in the sensor outputting directly to the MCU a respective analog signal representative of extent of the deformation.

In a further implementation, the sensor is positioned in the wearable HMI device in proximity to a finger joint of the user.

In a further implementation, the sensor is positioned in the wearable HMI device in proximity to an area of a user's hand between two fingers, such that relative movement between the two fingers causes deformation of the sensor.

In one implementation, there is a wearable gesture control interface apparatus for controlling a controllable device based on gestures provided by a user, said wearable gesture control interface apparatus including a plurality of sensors configured to detect one or more parameters of the user, including orientation, movement, position, flexion, and generate sensor data corresponding to said one or more parameters of the user; and a microcontroller operable in a low latency mode and a high accuracy mode, the microcontroller configured to: sample, using a sampling module, the sensor data from the plurality of sensors; determine, using a determining module, whether the sensor data from one of the plurality of sensors meets transmission criteria; and in accordance with a determination that the sensor data from the one of the plurality of sensors meets the transmission criteria, the microcontroller configured to: generate, using a generating module, control data based on the sensor data from a portion of the plurality of sensors when operating in the low latency mode; and generate, using the generating module, control data based on the sensor data from all of the plurality of sensors when operating in the high accuracy mode; and transmit, using a transmitting module, the control data to the controllable device.

In a further implementation, the transmission criteria is met when the sensor data from the one of the plurality of sensors exceeds a threshold.

In a further implementation, the control data includes gesture commands that, when executed by the controllable device, cause the controllable device to perform an action.

In a further implementation, the microcontroller is further configured to select, using a selecting module, a gesture command to the controllable device based on the sensor data from the plurality of sensors.

In a further implementation, the wearable gesture control interface apparatus further including a plurality of switches controllable by a user of the apparatus.

In a further implementation, the sensors comprise one or more flex sensors affixed to locations on the wearable gesture control apparatus that can be deformed by movements of a user of the apparatus, wherein the movements include movements of one or more finger or hand joints.

In a further implementation, generating the control data includes averaging the sensor data from the plurality of sensors to minimize a noise component in sensor data.

In a further implementation, each of the plurality of sensors that comprise the portion of the plurality of sensors has a different function and wherein at least two of the plurality of sensors are configured to measure an identical orientation or movement.

In a further implementation, a number of plurality of sensors is user-selectable after the plurality of sensors are connected to a microcontroller.

In a further implementation, each of the plurality of sensors are separated on a circuit board at fixed predetermined distances relative to another of the plurality of sensors.

In a further implementation, the microcontroller generates the sensor output based on the fixed predetermined distances separating the plurality of sensors.

In a further implementation, when the microcontroller operates in the low latency mode, the controllable device is one of: a gaming console, computer joystick and a computer mouse.

In a further implementation, when the microcontroller operates in the high accuracy mode, the controllable device is one of: an unmanned aerial vehicle and sign language software.

In a further implementation, when the microcontroller operates in the high accuracy mode, the microcontroller is configured to track hundreds of hand gesture based on a combination of any of: at least one inertial measurement sensor, at least one flex sensor, and at least one push button switch.

In a further implementation, the control data includes sensor data in a name value pair format.

In one implementation, there is a method for controlling a controllable device based on gestures provided by a user, including in a wearable gesture control interface apparatus having a microcontroller, a plurality of sensors, one or more functional modules and a memory storing programs for execution by the microcontroller: performing operations of the wearable gesture control interface apparatus of any of the implementations.

In one implementation, there is a non-transitory computer readable storage medium including a memory for use in a wearable gesture control interface apparatus having a microcontroller, a plurality of sensors and one or more functional modules, the memory storing programs that, when executed by the microcontroller, cause the wearable gesture control interface apparatus to operate as set out in any of the above implementations.

In one implementation, there is a method for controlling a controllable device based on user gestures, including: in a wearable gesture control interface apparatus having a microcontroller, a plurality of sensors, a transmitting module and a memory storing programs for execution by the microcontroller: sampling sensor data from the plurality of sensors in response to the gestures; determining whether the sensor data from one of the plurality of sensors meets transmission criteria; and in accordance with a determination that the sensor data from the one of the plurality of sensors meets the transmission criteria, transmitting using the transmitting module control data corresponding to sensor data from all of the plurality of sensors to the controllable device.

In a further implementation, the sensors comprise one or more of flex sensors; user actuatable switch sensors, including or more of buttons, sliders, switches, joystick and touch pad; and one or more motion sensors, including one or more of gyroscopes, magnetometers and accelerometers.

In a further implementation, the plurality of sensors and the microcontroller are mounted to a glove or to a portion thereof attachable to a hand of the user.

In a further implementation, the transmission criteria are met when the sensor data from the one of the plurality of sensors exceeds a predetermined threshold.

In a further implementation, the control data include gesture commands that, when executed by the controllable device, cause the controllable device to perform one or more respective actions associated with the gestures.

In a further implementation, including selecting and transmitting to the controllable device a gesture command based on the sensor data from the plurality of sensors.

In one implementation, there is a method for controlling a controllable device based on gestures provided by a user, including in a wearable gesture control interface apparatus having a microcontroller, a plurality of sensors and a memory storing programs for execution by the microcontroller: detecting using the plurality of sensors one or more parameters of the user, including orientation, movement, position, flexion; generating sensor data corresponding to the one or more parameters; determining an operating mode of the wearable gesture control device; sampling the sensor data from the plurality of sensors; generating a sensor output based on the sampled sensor data from a portion of the plurality of sensors when the operating mode is a low latency mode; and generating the sensor output based on the sensor data from all of the plurality of sensors when the operating mode is a high accuracy mode.

In a further implementation, the sensors comprise one or more of flex sensors; user actuable switch sensors, including or more of buttons, sliders, switches, joystick and touch pad; and one or more motion sensors, including one or more of gyroscopes, magnetometers and accelerometers.

In a further implementation, the plurality of sensors and the microcontroller are mounted to a glove or to a portion thereof attachable to a hand of the user.

In a further implementation, generating the sensor output includes averaging the sensor data from the plurality of sensors to minimize a noise component in the sensor data.

In a further implementation, each of the plurality of sensors that comprise the portion of the plurality of sensors has a different function and wherein at least two of the plurality of sensors are configured to measure an identical orientation or movement.

In a further implementation, each of the plurality of sensors are separated on a circuit board at fixed known distances relative to another of the plurality of sensors.

In a further implementation, the method further including generating the sensor output based on the fixed predetermined distances separating the plurality of sensors.

In one implementation, there is a method for controlling a controllable device based on gestures provided by a user, including in a wearable gesture control interface apparatus having a microcontroller, a plurality of sensors and a memory storing programs for execution by the microcontroller: detecting using a plurality of sensors one or more parameters of the user, including orientation, movement, position, flexion; generating sensor data corresponding to the one or more parameters; detecting an operating mode of the wearable gesture control interface apparatus; sampling the sensor data from the plurality of sensors; determining whether the sensor data from one of the plurality of sensors meets transmission criteria; and in accordance with a determination that the sensor data from the one of the plurality of sensors meets the transmission criteria: generating control data based on the sensor data from a portion of the plurality of sensors when the operating mode is a low latency mode; and generating the control data based on the sensor data from all of the plurality of sensors when the operating mode is a high accuracy mode; and transmitting the control data to the controllable device.

In a further implementation, the transmission criteria is met when the sensor data from the one of the plurality of sensors exceeds a predefined threshold.

In a further implementation, the control data includes one or more respective gesture commands that, when executed by the controllable device, cause the controllable device to perform an action associated with the one or more respective gesture commands.

In a further implementation, the method including selecting from a gesture database the one or more respective gesture commands based on sensor data from the plurality of sensors, wherein the gesture databases stores associations between respective gesture commands and sensor data.

In a further implementation, the wearable gesture control interface apparatus further includes a plurality of switches controllable by a user of the apparatus.

In a further implementation, the sensors comprise one or more flex sensors affixed to locations on the wearable gesture control apparatus that can be deformed by movements of a user of the apparatus, wherein the movements include movements of one or more finger or hand joints.

In a further implementation, generating the control data includes averaging the sensor data from the plurality of sensors to minimize a noise component in the sensor data.

In a further implementation, each of the plurality of sensors that comprise the portion of the plurality of sensors has a different function and wherein at least two of the plurality of sensors are configured to measure an identical orientation or movement.

In a further implementation, a number of the plurality of sensors is user-selectable after the plurality of sensors are connected to a microcontroller.

In a further implementation, each of the plurality of sensors is separated on a circuit board at fixed known distances relative to another of the plurality of sensors.

In a further implementation, the method further including generating the sensor output based on the fixed known distances separating the plurality of sensors.

In a further implementation, when the microcontroller operates in the low latency mode, the controllable device is one of: a gaming console, computer joystick and a computer mouse.

In a further implementation, when the microcontroller operates in the high accuracy mode, the controllable device is one of: an unmanned aerial vehicle and sign language software.

In a further implementation, the method further including, when the operating mode is the high accuracy mode, tracking hundreds of hand gestures based on a combination of any of: at least one inertial measurement sensor, at least one flex sensor, and at least one push button switch.

Each of the methods described herein is typically governed by instructions that are stored in a computer readable storage medium and that are executed by one or more processors of one or more servers or client devices. The above identified modules or programs (i.e., sets of instructions) need not be implemented as separate software programs, procedures or modules, and thus various subsets of these modules will be combined or otherwise re-arranged in various implementations.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for controlling an application of a controllable device based on user gestures performed by a user, comprising:
   at a wearable gesture control interface apparatus having a microcontroller, a plurality of sensors for detecting user gestures performed by the user, and a memory storing programs for execution by the microcontroller:
   sampling sensor data from the plurality of sensors in response to the user gestures;
   determining whether the sensor data from at least one, less than all, of the plurality of sensors meets transmission criteria; and
   in accordance with a determination that the sensor data from the at least one, less than all, of the plurality of sensors meets the transmission criteria, transmitting control data corresponding to the sensor data from the plurality of sensors to the controllable device.

2. The method of claim 1, wherein the controllable device is at least one of: a vehicle, a gaming console, a visual display, a television, a home automation appliance, a sign-language interpretation application, a computer joystick, and a computer mouse.

3. The method of claim 1, wherein the application of the controllable device is a virtual reality application.

4. The method of claim 1, wherein the plurality of sensors comprise one or more of flex sensors; user actuatable switch sensors including one or more of buttons, sliders, switches, joystick and touch pad; and one or more motion sensors, including one or more of gyroscopes, magnetometers and accelerometers.

5. The method of claim 1, wherein the plurality of sensors comprise two or more sensors that measure a same characteristic of the user gesture.

6. The method of claim 1, wherein the control data includes a user gesture command that, when executed by the controllable device, causes the controllable device to perform an action.

7. The method of claim 1, further comprising: selecting from a gesture database the one or more respective gesture commands based on the control data from the one or more sensors, wherein the gesture database stores associations between respective gesture commands and control data, and wherein when executed by the controllable device, the user gesture command causes the controllable device to perform an action.

8. The method of claim 7, wherein at least one of the respective gesture commands is based on the control data from at least two or more sensors.

9. The method of claim 8, wherein the at least two of the plurality of sensors includes a static sensor and one of: an inertial sensor and a flex sensor.

10. The method of claim 1, wherein the plurality of sensors and the microcontroller are mounted to a glove or to a portion thereof attachable to a hand of the user.

11. A wearable gesture control interface apparatus for controlling an application of a controllable device based on gestures provided by a user, said wearable gesture control interface apparatus comprising:
   a plurality of sensors for detecting user gestures performed by the user,
   one or more memory units each operable to store at least one program; and
   at least one microcontroller communicatively coupled to the one or more memory units, in which the at least one program, when executed by the at least one microcontroller, causes the at least one microcontroller to:
   sample sensor data from the plurality of sensors in response to the user gestures;
   determine whether the sensor data from at least one, less than all, of the plurality of sensors meets transmission criteria; and
   in accordance with a determination that the sensor data from the at least one, less than all, of the plurality of sensors meets the transmission criteria, transmit control data corresponding to sensor data from the plurality of sensors to the controllable device.

12. The wearable gesture control interface apparatus of claim 11, wherein the controllable device is at least one of: a vehicle, a gaming console, a visual display, a television, a home automation appliance, a sign-language interpretation application, a computer joystick, and a computer mouse.

13. The wearable gesture control interface apparatus of claim 11, wherein the application of the controllable device is a virtual reality application.

14. The wearable gesture control interface apparatus of claim 11, wherein the plurality of sensors comprise one or more of flex sensors; user actuatable switch sensors including or more of buttons, sliders, switches, joystick and touch pad; and one or more motion sensors, including one or more of gyroscopes, magnetometers and accelerometers.

15. The wearable gesture control interface apparatus of claim 11, wherein the plurality of sensors comprise two or more sensors that measure a same characteristic of the user gesture.

16. The wearable gesture control interface apparatus of claim 11, wherein the control data includes a user gesture command that, when executed by the controllable device, causes the controllable device to perform an action.

17. The wearable gesture control interface apparatus of claim 11, wherein the microcontroller is further configured to:
select from a gesture database the one or more respective gesture commands based on the control data from the one or more sensors,
wherein the gesture database stores associations between respective gesture commands and control data, and
wherein when executed by the controllable device, the user gesture command causes the controllable device to perform an action.

18. The wearable gesture control interface apparatus of claim 17, wherein at least one of the respective gesture commands is based on the control data from at least two or more sensors.

19. The wearable gesture control interface apparatus of claim 18, wherein the at least two of the plurality of sensors includes a static sensor and one of: an inertial sensor and a flex sensor.

20. The wearable gesture control interface apparatus of claim 11, wherein the plurality of sensors and the microcontroller are mounted to a glove or to a portion thereof attachable to a hand of the user.

21. A non-transitory computer readable storage medium storing one or more programs for controlling an application of a controllable device based on gestures provided by a user, the one or more programs comprising instructions, which when executed by a wearable gesture control interface apparatus including a microcontroller and a plurality of sensors for detecting user gestures performed by the user, cause the microcontroller of the wearable gesture control interface apparatus to:
sample sensor data from the plurality of sensors in response to the user gestures;
determine whether the sensor data from at least one, less than all, of the plurality of sensors meets transmission criteria; and
in accordance with a determination that the sensor data from the at least one, less than all, of the plurality of sensors meets the transmission criteria, transmit control data corresponding to sensor data from the plurality of sensors to the controllable device.

22. The non-transitory computer readable storage medium of claim 21, wherein the controllable device is at least one of: a vehicle, a gaming console, a visual display, a television, a home automation appliance, a sign-language interpretation application, a computer joystick, and a computer mouse.

23. The non-transitory computer readable storage medium of claim 21, wherein the application of the controllable device is a virtual reality application.

24. The non-transitory computer readable storage medium of claim 21, wherein the plurality of sensors comprise one or more of flex sensors; user actuatable switch sensors including or more of buttons, sliders, switches, joystick and touch pad; and one or more motion sensors, including one or more of gyroscopes, magnetometers and accelerometers.

25. The non-transitory computer readable storage medium of claim 21, wherein the plurality of sensors comprise two or more sensors that measure a same characteristic of the user gesture.

26. The non-transitory computer readable storage medium of claim 21, wherein the control data includes a user gesture command that, when executed by the controllable device, causes the controllable device to perform an action.

27. The non-transitory computer readable storage medium of claim 21, wherein the microcontroller is further configured to:
select from a gesture database the one or more respective gesture commands based on the control data from the one or more sensors,
wherein the gesture database stores associations between respective gesture commands and control data, and
wherein when executed by the controllable device, the user gesture command causes the controllable device to perform an action.

28. The non-transitory computer readable storage medium of claim 27, wherein at least one of the respective gesture commands is based on the control data from at least two or more sensors.

29. The non-transitory computer readable storage medium of claim 28, wherein the at least two of the plurality of sensors includes a static sensor and one of: an inertial sensor and a flex sensor.

30. The non-transitory computer readable storage medium of claim 21, wherein the plurality of sensors and the microcontroller are mounted to a glove or to a portion thereof attachable to a hand of the user.

* * * * *

UNITED STATES PATENT AND TRADEMARK OFFICE
CERTIFICATE OF CORRECTION

| | |
|---|---|
| PATENT NO. | : 9,846,482 B2 |
| APPLICATION NO. | : 15/237587 |
| DATED | : December 19, 2017 |
| INVENTOR(S) | : Seth |

It is certified that error appears in the above-identified patent and that said Letters Patent is hereby corrected as shown below:

In the Claims

Claim 14, Column 25, Lines 11-12, please delete "including or more" and insert --including one or more--;

Claim 24, Column 26, Line 20, please delete "including or more" and insert --including one or more--.

Signed and Sealed this
Twentieth Day of February, 2018

Andrei Iancu
*Director of the United States Patent and Trademark Office*